US011455833B2

(12) United States Patent
Yoon et al.

(10) Patent No.: US 11,455,833 B2
(45) Date of Patent: Sep. 27, 2022

(54) ELECTRONIC DEVICE FOR TRACKING USER ACTIVITY AND METHOD OF OPERATING THE SAME

(71) Applicant: SAMSUNG ELECTRONICS CO., LTD., Suwon-si (KR)

(72) Inventors: Junkeun Yoon, Suwon-si (KR); Munsik Kim, Suwon-si (KR); Jihyun Lee, Suwon-si (KR); Jungho Cho, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 16/600,872

(22) Filed: Oct. 14, 2019

(65) Prior Publication Data

US 2020/0202114 A1 Jun. 25, 2020

(30) Foreign Application Priority Data

Dec. 19, 2018 (KR) .................... 10-2018-0165544

(51) Int. Cl.
*G06V 40/20* (2022.01)
*G06F 16/587* (2019.01)
(Continued)

(52) U.S. Cl.
CPC ............ *G06V 40/20* (2022.01); *G06F 16/587* (2019.01); *G06K 9/6267* (2013.01); *G06T 7/20* (2013.01);
(Continued)

(58) Field of Classification Search
CPC ..... G01S 3/802; G06F 16/587; G06K 9/6267; G06T 2207/30196; G06T 7/20;
(Continued)

(56) References Cited

U.S. PATENT DOCUMENTS

| 10,775,969 | B2 * | 9/2020 | Louvton | ............ G06F 16/9566 |
| 2005/0104958 | A1 | 5/2005 | Egnal et al. | |
| 2008/0238768 | A1 | 10/2008 | Nosworthy | |
| 2013/0083003 | A1 * | 4/2013 | Perez | ...................... G06T 11/20 |
| | | | | 345/419 |

(Continued)

FOREIGN PATENT DOCUMENTS

KR 10-2014-0133069 11/2014

OTHER PUBLICATIONS

International Search Report dated Jan. 10, 2020 in counterpart International Patent Application No. PCT/KR2019/012766.

*Primary Examiner* — Farzana Hossain
(74) *Attorney, Agent, or Firm* — Nixon & Vanderhye P.C.

(57) ABSTRACT

Disclosed are an electronic device and a method of operating the same. The electronic device includes: a housing: a user interface; at least one microphone disposed in the housing; at least one camera disposed in the housing; at least one driver comprising driving circuitry connected to or disposed in the housing and configured to move the housing; a wireless communication circuit disposed within the housing; a processor operatively connected to the user interface, the microphone, the camera, the driver, and the wireless communication circuit; and a memory operatively connected to the processor, wherein the memory stores instructions which, when executed by the processor, control the electronic device to: acquire a voice and/or an image of a user through the microphone and/or the camera, identify the user based on the voice and/or the image, identify an activity of the user based on at least one piece of movement information of the identified user, location information, or information on an object that the user is using, determine a location from which to track the user based on the identified activity, control the driver to move the housing based at least in part on the determined location, track the activity of the user based on continuity of the activity after movement, and provide a result of the activity based on the tracking result.

17 Claims, 17 Drawing Sheets

(51) Int. Cl.
*G06K 9/62* (2022.01)
*G06T 7/20* (2017.01)
*H04N 5/232* (2006.01)
*H04N 5/225* (2006.01)
*G06T 7/70* (2017.01)
*G10L 17/00* (2013.01)
*G06V 40/10* (2022.01)

(52) U.S. Cl.
CPC ............... *G06T 7/70* (2017.01); *G06V 40/10* (2022.01); *G10L 17/00* (2013.01); *H04N 5/2257* (2013.01); *H04N 5/23299* (2018.08); *G06T 2207/30196* (2013.01)

(58) Field of Classification Search
CPC ........ G06T 7/70; G06V 40/10; G06V 40/172; G06V 40/174; G06V 40/20; G10L 17/00; H04N 5/2257; H04N 5/232; H04N 5/23299; H04N 7/185
See application file for complete search history.

(56) References Cited

U.S. PATENT DOCUMENTS

| | | | | |
|---|---|---|---|---|
| 2013/0262352 A1* | 10/2013 | Sung | ................. | G06K 9/00342 706/12 |
| 2015/0347912 A1* | 12/2015 | Rodzevski | ............. | G01P 15/02 706/11 |
| 2016/0216772 A1 | 7/2016 | Cohen et al. | | |
| 2017/0078418 A1* | 3/2017 | Pennanen | ............. | A61B 5/103 |
| 2017/0315681 A1* | 11/2017 | Kang | .................... | G06F 3/0482 |
| 2018/0349699 A1* | 12/2018 | O'Connell | ........... | G06T 19/006 |

\* cited by examiner

… (1)

ELECTRONIC DEVICE FOR TRACKING USER ACTIVITY AND METHOD OF OPERATING THE SAME

CROSS-REFERENCE TO RELATED APPLICATION

This application is based on and claims priority under 35 U.S.C. § 119 to Korean Patent Application No. 10-2018-0165544, filed on Dec. 19, 2018, in the Korean Intellectual Property Office, the disclosure of which is incorporated by reference herein in its entirety.

BACKGROUND

1) Field

The disclosure relates to an electronic device for tracking user activity and a method of operating the same.

2) Description of Related Art

Various electronic devices such as smart phones, tablet personal computers (PCs), portable multimedia players (PMPs), personal digital assistants (PDAs), laptop PCs, and wearable devices have been distributed.

Further, electronic devices that are disposed in a space in which users reside and provide various services to the users have recently been introduced. Such electronic devices may track user activity and provide various services related to the user activity to the user. An electronic device may include a camera sensor and continuously track the user through the camera sensor.

An electronic device, which tracks user activity, is disposed to be fixed in a space in which a user resides and thus is somewhat capable of tracking static activity but may have difficulty tracking dynamic activity.

Further, when a specific event occurs (for example, when the electronic device is impacted or a preset event occurs), the electronic device, which tracks user activity, can track the user activity but may have difficulty continuously tracking the user activity.

A mobile electronic device is required to continuously move in order to track user activity, but is it difficult to design a detailed algorithm related to the movement in order to accurately track the user activity.

The above information is presented as background information only to assist with an understanding of the disclosure. No determination has been made, and no assertion is made, as to whether any of the above might be applicable as prior art with regard to the disclosure.

SUMMARY

In accordance with an example aspect of the disclosure, an electronic device is provided. The electronic device includes: a housing; a user interface; at least one microphone disposed in the housing; at least one camera disposed in the housing; at least one driver comprising driving circuitry connected to or disposed in the housing and configured to move the housing; a wireless communication circuit disposed within the housing; a processor operatively connected to the user interface, the microphone, the camera, the driver, and the wireless communication circuit; and a memory operatively connected to the processor, wherein the memory stores instructions which, when executed by processor, control the electronic device to acquire a voice and/or an image of a user through the microphone and/or the camera, identify the user based on the voice and/or the image, identify an activity of the user based on at least one piece of movement information of the identified user, location information, or information on an object that the user is using, determine a location from which to track the user based on the identified activity, control the driver to move the housing based at least in part on the determined location, track the activity of the user based on continuity of the activity after movement, and provide a result of the activity based on the tracking result.

In accordance with another example aspect of the disclosure, a method of operating an electronic device is provided. The method includes: acquiring a voice and/or an image of a user through a microphone and/or a camera of the electronic device; identifying the user based on the voice and/or the image; identifying an activity of the user based on at least one piece of movement information of the identified user, location information, or information on an object that the user is using; determining a location from which to track the user based on the identified activity; controlling a driver of the electronic device to move the housing based at least in part on the determined location; tracking the activity of the user based on continuity of the activity after movement; and providing a result of the activity based on the tracking result.

An electronic device according to various example embodiments can analyze an image or a voice acquired while continuously tracking the activity of a user and change in real (or substantially real) time the location at which the activity of the user is smoothly tracked, thereby accurately tracking the activity of the user.

An electronic device according to various example embodiments can provide the result of the tracked activity of the user in various methods and improve accessibility of the result of the activity of the user.

An electronic device according to various example embodiments can classify in advance the result of the activity of the user in various methods and provide the classified result of the activity in response to a request from the user, thereby transmitting only an activity result required by the user.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
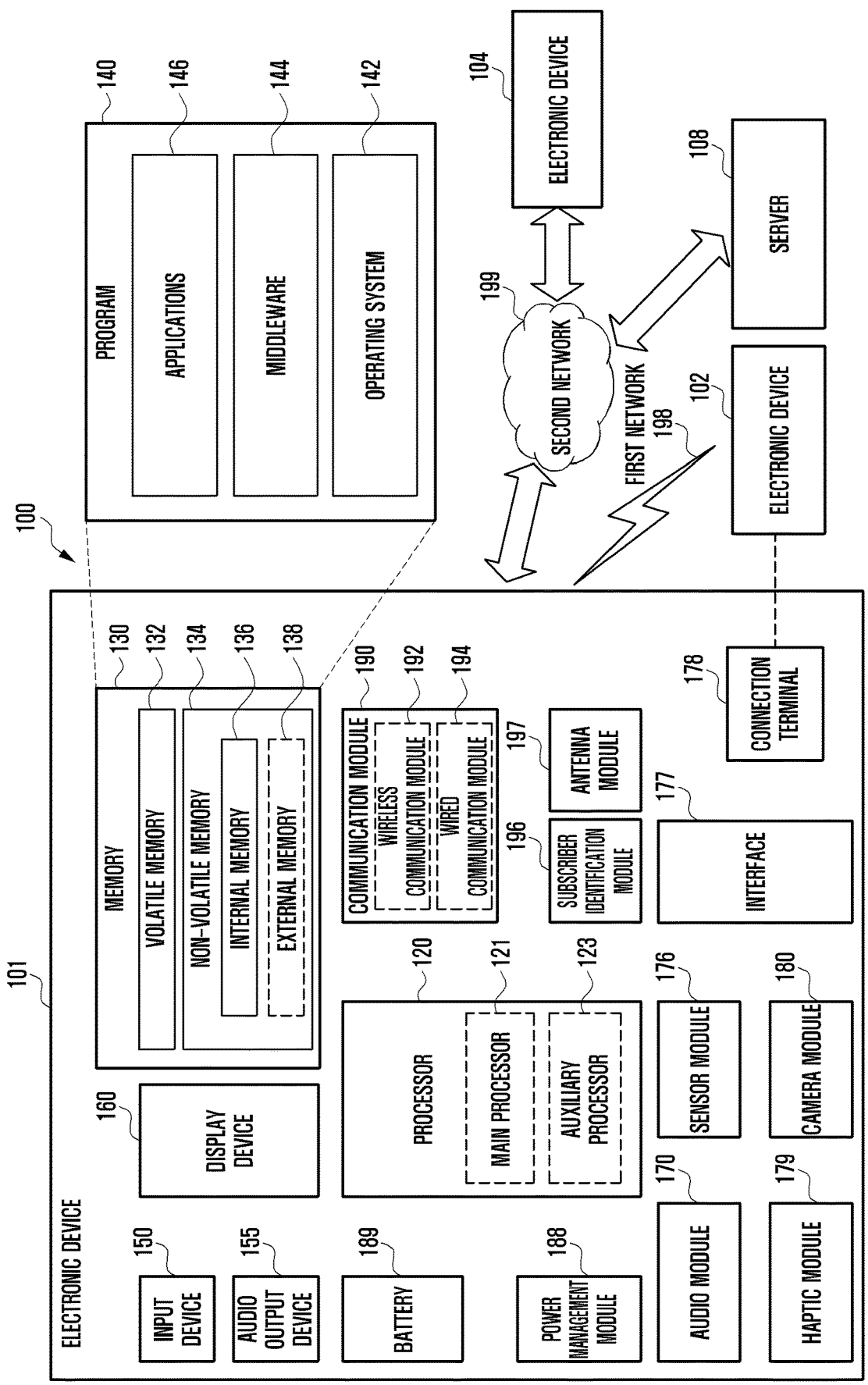
FIG. 1 is a block diagram illustrating an example electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
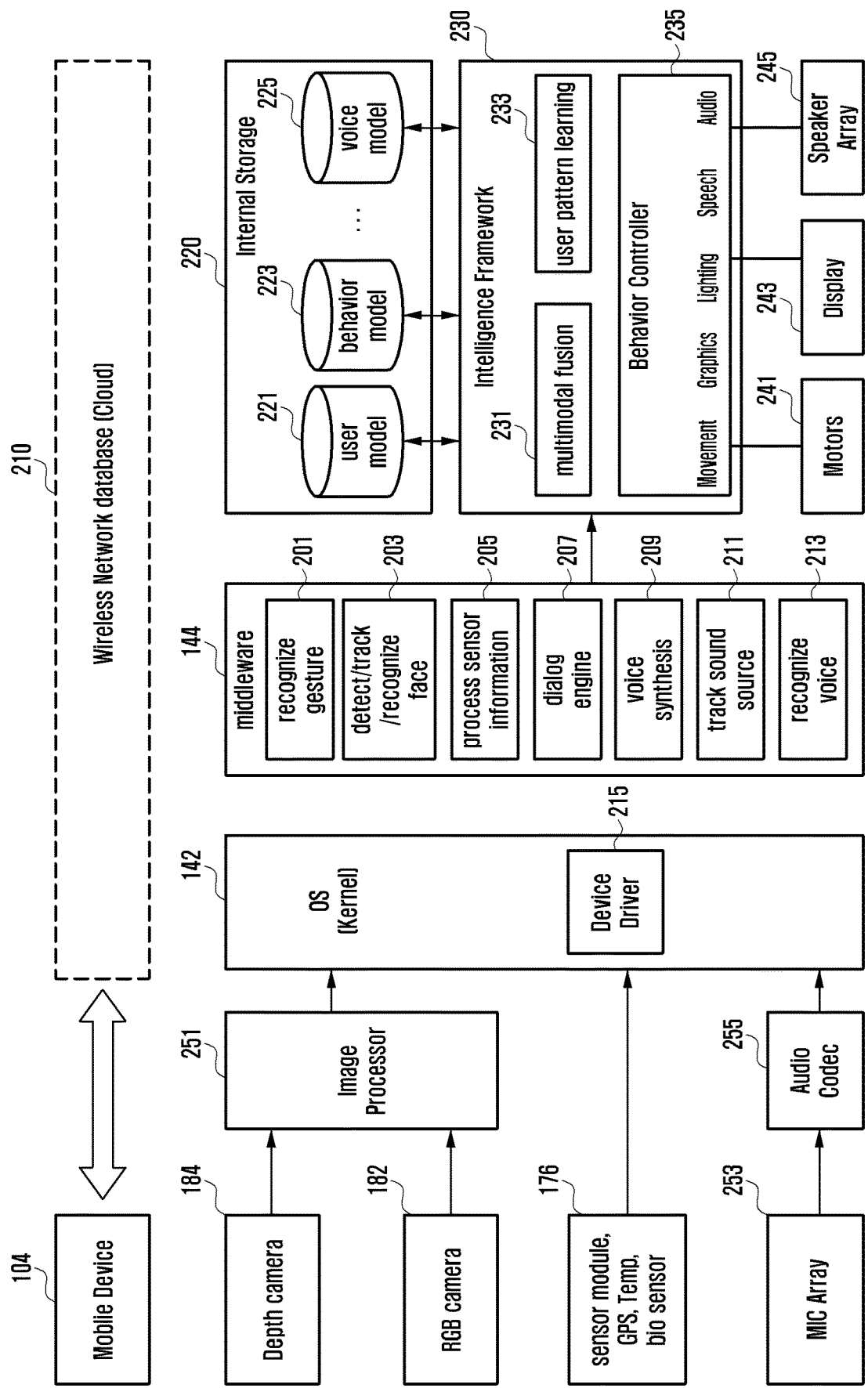
FIG. 2 is a block diagram illustrating an example program according to various embodiments.

FIG. 2 is a block diagram illustrating an example program according to various embodiments of the disclosure. Referring to FIG. 2, software of an electronic device may include an operating system (OS) for controlling one or more resources of the electronic device, middleware, intelligent framework, or an internal storage unit. The operating system may include, for example, Android™, iOS™, Windows™, Symbian™, Tizen™, or Bada™. For example, at least some of the software programs may be preloaded to the electronic device when the electronic device is manufactured or may be downloaded from an external electronic device (for example, the electronic device 102 or 103 or the server 108) when the electronic device is used by the user.

The operating system may control management (for example, allocation or withdrawal) of one or more system resources of the electronic device (for example, a process, a memory, or power). Additionally or alternatively, the operating system 142 may include one or more driver programs for driving different hardware devices of the electronic device 101, for example, the input device 150, the sound output device 155, the display device 160, the behavior module 163, the audio module 170, the sensor module 176, the interface 177, the haptic module 179, the camera module 180, the power management module 188, the battery 189, the communication module 190, the subscriber identification module 196, or the antenna module 197.

A RGB camera 182 may capture external objects by using RGB sensors. A depth camera 184 may capture depth image regarding the external objects. The depth image includes information on the object distance. Image processor 251 may perform a plurality of processing of the data captured by the RGB camera 182 or the depth camera 184.

A MIC array 253 may be detect sound. MIC array 253 may include a plurality of microphones, and may detect a direction of sound source outputting the sound. An audio codec 255 may perform digital conversion on the sound transmitted from the MIC array 253. The audio codec 255 may encode on the digital data and transmit the encoded data to the OS 142.

The middleware 144 may detect or track the location of a user's face based on signal-processed data or perform authentication through face recognition. The middleware may serve to recognize a 3D gesture, track a location at which an audio signal is input (direct of arrival (DOA)), recognize a voice, and process signals of various pieces of sensor data. The middleware may include, for example, a gesture recognition manager 201, a face detecting/tracking/ recognizing manager 203, a sensor information processing manager 205, a dialog engine manager 207, a voice synthesis manager 209, a sound source tracking manager 211, and/or a voice recognition manager 213.

The intelligent framework 230 may include, for example, a multimodal fusion block 231, a user pattern learning block 233, and/or a behavior control block (behavior controller) 235. The multimodal fusion block may serve to, for example, collect and manage various pieces of information processed by the middleware. The user pattern learning block may extract and learn meaningful information such as a life pattern and preference of the user based on, for example, information of the multimodal fusion block. The behavior control block may express, for example, information of which feedback is provided from the electronic device to the user in the form of movement, graphic (UI/ UX), light, a voice response, or a sound.

The internal storage unit 220 (internal storage) may include, for example, a user model DB 221, a behavior model DB 223, and/or a voice model DB 225. The user model DB may store, for example, user-specific information learned by the intelligent framework. The behavior model DB may store, for example, information for controlling the behavior of the electronic device. The information stored in each of the DBs may be stored in or shared with, for example, a wireless network DB 210 (for example, cloud).

The behavior controller 235 may operatively connected at least one of motor 241, display 243 or speaker array 245. The motor 241 may perform a movement of the electronic device 101. The speaker array 245 may output sound in a specific direction.

Figure 3:
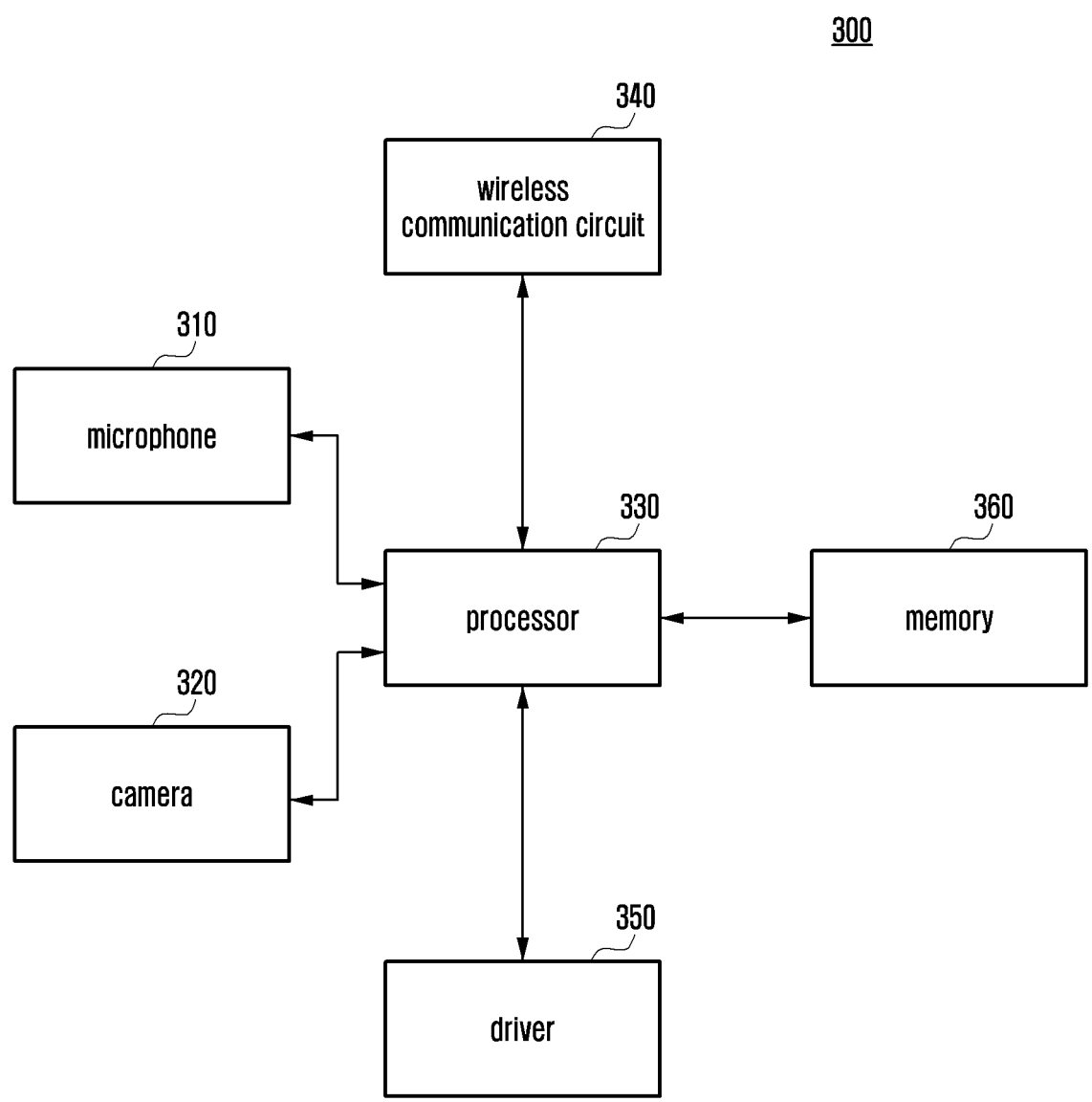
FIG. 3 is a block diagram illustrating an example electronic device according to various embodiments of the disclosure.

FIG. 3 is a block diagram illustrating an example electronic device according to various embodiments of the disclosure.

Referring to FIG. 3, an electronic device 300 (for example, the electronic device 100 of FIG. 1) according to various embodiments of the disclosure may include at least one microphone 310, at least one camera 320, a processor (e.g., including processing circuitry) 330 (for example, the processor 120 of FIG. 1), a wireless communication circuit 340 (for example, the wireless communication module 190 of FIG. 1), a driver (e.g., including driving circuitry) 350 (for example, the activity module 163), and a memory 360 (for example, the memory 130 of FIG. 1).

The electronic device 300 according to various embodiments of the disclosure may refer, for example, to a movable electronic device to track user activity. The user activity may, for example, be a set of movements that the user continuously performs with specific intent. For example, the user may play music in a specific space, in which case continuous movements for music playing may be defined as one activity. The user may perform activities having a plurality of intents during a preset time, in which case it may be considered that the user performs a number of activities corresponding to the number of the plurality of intents. Tracking the user activity by the electronic device 300 may include all operations of acquiring various scenes and various sounds that may be generated while the user performs the activity, analyzing the scenes and the sounds, and outputting the analysis result. The scene may be an image including a user figure at a specific time point. The electronic device 300 may analyze scenes captured according to the lapse of time and identify activities included in at least some of a plurality of scenes based on the analysis result.

According to various embodiments of the disclosure, the electronic device 300 may include a housing (not shown), and at least one microphone 310 and at least one camera 320 may be disposed in the housing. The electronic device 300 may track user activity through the at least one microphone 310 and/or the at least one camera 320. The electronic device 300 may acquire a sound that may be generated while the user performs the activity (for example, a user's voice or a sound generated by surrounding objects while the user performs the activity) through the at least one microphone

310. The electronic device 300 may acquire an image obtained by capturing the user and surrounding objects through the at least one camera 320 while the user performs the activity.

According to various embodiments of the disclosure, the wireless communication circuit 340 may transmit/receive data to/from an external electronic device connected to the electronic device 300 through various wireless communication methods (for example, a cellular network or Wi-Fi). For example, the electronic device 300 may transmit or receive data required to analyze the activity to or from the external electronic device through the wireless communication circuit 340. The electronic device 300 may transmit, through the wireless communication circuit 340, data for controlling the external electronic device to perform an operation of collecting data available for tracking the user activity through various sensors of the external electronic device. In another example, the electronic device 300 may transmit the result of tracking the user activity to the external electronic device through the wireless communication circuit 340.

According to various embodiments of the disclosure, the electronic device 300 may include a user interface (not shown) for interacting with various users. The electronic device 300 may receive various instructions for tracking the user activity through the user interface.

According to various embodiments of the disclosure, the processor 330 may be operatively connected to various elements of the electronic device 300 including the microphone 310, the camera 320, the memory 360, the wireless communication circuit 340, and the driver 350, and may include various processing circuitry and control the elements of the electronic device 300. Hereinafter, the various functions recited as being performed by the processor may be performed by the electronic device under control of the processor, the processor and/or any other element under the control of the processor, and recitations of the processor performing the various functions is not limited to the processor itself performing the functions. The processor 330 may control the elements of the electronic device 300 using various instructions stored in the memory 360.

According to various embodiments of the disclosure, the processor 330 may control the electronic device 300 to acquire a voice and/or an image of the user through the microphone 310 and/or the camera 320. The voice or the image of the user acquired by the processor 330 may be data related to the activity acquired while the user performs the activity.

According to various embodiments of the disclosure, the processor 330 may control the electronic device 300 to identify the user included in the acquired voice or image based on the acquired voice or image. The processor 330 may control the electronic device 300 to identify the user included in the voice acquired using a voice model. An example embodiment of identifying the user included in the voice will be described below with reference to FIG. 12. The processor 330 may control the electronic device 300 to identify the user included in the image acquired using a user model. An example embodiment of identifying the user included in the image will be described below with reference to FIG. 9.

According to various embodiments of the disclosure, the processor 330 may identify the user activity based on at least one piece of movement information of the identified user, location information, or information on an object that the user is using. The processor 330 may identify the type or the characteristics of the user activity (for example, a characteristic indicating an activity having a wide scope of movement or an activity having a narrow scope of movement, or a characteristic indicating a dynamic activity or a static activity).

According to various embodiments of the disclosure, the processor 330 may use various models including one or more models for recognizing an environment around the user in order to identify the user activity and one or more models for identifying the user activity, and an example embodiment for identifying the user activity will be described below with reference to FIG. 4.

According to various embodiments of the disclosure, the processor 330 may determine the location of the user to be tracked based on the identified activity. The determined location may include the location at which the user activity can be tracked or a range of the distance between the user and the electronic device 300 in order to track the user activity, and may refer to a location at which it is easy to track the user activity. The processor 330 may determine the location at which the user is to be tracked based on the identified activity type and the identified activity characteristics. The memory 360 may store information related to the range within which the user can be tracked based on the activity type and characteristics. The processor 330 may determine the location from which to track the user based on information related to the range within which the user can be tracked, corresponding to the identified activity type and the identified activity characteristics.

According to various embodiments of the disclosure, the processor 330 may predict a movement range while the user performs the activity based on the activity characteristics and determine the location from which to track the user based on the predicted movement range.

According to various embodiments of the disclosure, the processor 330 may control the driver 350 to move the housing based on at least a portion of the determined location. The electronic device 300 may include the driver 350 for movement of the electronic device 300. For example, the driver 350 may include various driving circuitry responsive to the control of the processor (including instructions executed by the processor) including, for example, one or more movement means (for example, wheels or legs) for movement of the electronic device 300 and various components (for example, a motor) for delivering power to the wheels. The driver 350 may allow the electronic device 300 to move to the determined location under the control of the processor 330.

According to various embodiments of the disclosure, the processor 330 may track the user activity based on continuity of the activity after movement of the housing is completed. The continuity of the activity may, for example, be a characteristic of continuously performing the same activity. For example, when it is assumed that the user performs an activity of watching TV after performing an activity of playing the piano, the processor 330 may determine that the continuity of the activity is maintained while the user plays the piano. The moment the user starts watching TV, the processor 330 may determine that the continuity of the activity is interrupted. While the user watches TV, the processor 330 may determine that the continuity of the activity is maintained. The processor 330 may track the user activity in response to a determination that the continuity of the activity is maintained. The processor 330 may determine that the user performs a new activity in response to a determination that the continuity of the activity is interrupted. The processor 330 may perform various operations for tracking the new activity (operations including activity recognition and determination of the location at which the new activity is tracked) in response to the determination that the user performs the new activity.

According to various embodiments of the disclosure, the processor 330 may analyze an image acquired using the camera 320 in real time while the user activity is tracked. The processor 330 may determine whether the user can be identified using the acquired image based on the result analyzed in real time. The processor 330 may determine to move the electronic device 300 based on at least a portion of the determination result indicating that the user cannot be identified and may control the driver 350 to move the electronic device 300. The processor 330 may determine whether at least a body part of the user related to the activity, among the user's whole body, can be identified through the acquired image based on the result analyzed in real time. The processor 330 may determine to move the electronic device 300 based on at least a portion of the result indicating that at least a portion of the user's body related to the activity cannot be identified and may control the driver 350 to move the electronic device 300. An example embodiment in which the electronic device 300 moves while the user activity is tracked will be described in detail with reference to FIG. 10.

According to various embodiments of the disclosure, the processor 330 may provide the result of the activity based on the tracking result. The result of the activity may be various pieces of data including the place in which the activity is performed, the target to be tracked, the start time of the activity, the end time of the activity, the type of the activity, and the emotion (e.g., mood) of the user.

According to various embodiments of the disclosure, the processor 330 may complete tracking of the user activity based on the continuity of the activity and classify the activity based on the tracking result. The references for classifying the activity may be various. The processor 330 may classify the activity according to various references including the place in which the activity is performed, the target to be tracked, the start time of the activity, the end time of the activity, the type of the activity, and the emotion of the user. The classification of the activity may be performed after the activity ends, but there is no limitation thereon. The classified activity may be used to provide the result of the activity. An example embodiment thereof will be described below with reference to FIG. 14.

According to various embodiments of the disclosure, methods of providing the result of the activity may be various. For example, the result of the activity may be provided through a user interface (not shown) (for example, a speaker or a display). In another example, the processor 330 may provide the result of the activity through a method of transmitting the result of the activity to an external electronic device through the wireless communication circuit 340. The external electronic device may provide the result of the activity through an augmented-reality platform. An example embodiment of providing the result of the activity through an augmented-reality platform will be described below with reference to FIG. 16.

According to various embodiments of the disclosure, although it has been described that the electronic device 300 moves to the location at which it is easy to track the activity in order to track the user activity, the electronic device 300 may not move depending on the circumstances. The processor 300 may identify whether there is an external electronic device capable of tracking the user activity in a space in which the user performs the activity. For example, the processor 330 may identify whether there is an external electronic device including a module (for example, a camera module) capable of tracking the user activity in the space in which the user performs the activity. The processor 330 may control the external electronic device to track the user activity based on at least a portion of the identified result indicating the existence of the external electronic device and may receive the result of tracking the external electronic device. In this example, the processor 330 may not move the electronic device 300 at least partly based on the identification of the existence of the external electronic device. The driver 350 does not receive a control instruction for separate movement, and thus the electronic device 300 may not move.

Figure 4:
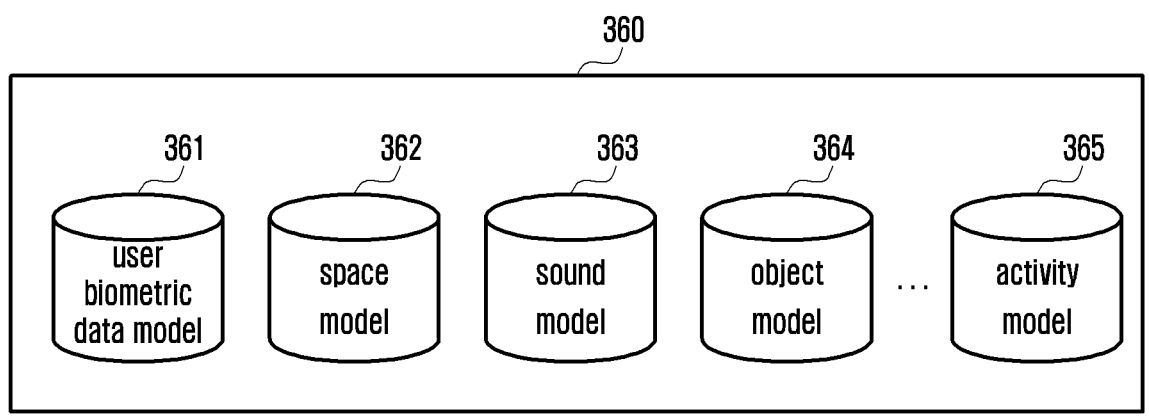
FIG. 4 is a diagram illustrating example models for tracking a user activity stored in a memory of the electronic device according to various embodiments of the disclosure.

FIG. 4 is a diagram illustrating example models for tracking a user activity stored in the memory of the electronic device according to various embodiments of the disclosure.

Referring to FIG. 4, a memory (for example, the memory 360 of FIG. 3) of an electronic device (for example, the electronic device 300 of FIG. 3) according to various embodiments of the disclosure may track user activity and store models for classifying the user activity. The models stored in the memory 360 may be generated by the electronic device 300, or may be generated by an external server connected to the electronic device 300 and transmitted to the electronic device 300. The models stored in the memory 360 may be continuously updated based on the tracking result. The electronic device 300 may make a request for information to the user of the electronic device 300 in order to improve the accuracy of the models stored in the memory 360 and update the models stored in the memory 360 based on information input by the user.

According to various embodiments of the disclosure, the models stored in the memory 360 may include a user body data model (e.g., including various data/information) 361, a space model (e.g., including various data/information) 362, a sound model (e.g., including various data/information) 363, an object model (e.g., including various data/information) 364, and an activity model (e.g., including various data/information) 365.

According to various embodiments of the disclosure, the user body data model 361 may store body information for identifying at least one user for whom activity is to be tracked and identify at least one user. User's body information may include the age of the user, the gender of the user, face information of the user (various pieces of information including the contour of a face, the size of a face, and the shape of a face), the height of the user, the body type of the user, the frame of the user, or user's voice information. The user's body information may be collected using various sensors (for example, a camera (for example, the camera 320 of FIG. 3) or a microphone (for example, the microphone 310 of FIG. 3)) included in the electronic device 300, or may be received from an external electronic device (for example, an external server) which has completed mutual authentication with the electronic device 300. The user's body information may be changed according to the age or gender of the user and thus may be periodically updated. The processor 330 may improve the performance of tracking of the activity by continuously updating the collected body information according to the result of tracking the user activity. Although it has been illustrated that the body information is stored in the memory 360, the body information may be stored in another memory (not shown) having relatively higher security or an external storage unit.

According to various embodiments of the disclosure, in order to improve the performance of tracking of the user activity, the electronic device 300 may store, in the memory 360, a plurality of models for recognizing information on the environment in which the user activity is performed. The plurality of models for recognizing the information on the environment in which the user activity is performed may include the space model 362, the sound model 363, and the object model 364.

According to various embodiments of the disclosure, the space model 362 may store information on a space (for example, indoor) in which the user activity is performed. The electronic device 300 may determine a range of the space in which the user activity is tracked and manage the space model 362 by acquiring and processing information on the determined range.

According to various embodiments of the disclosure, the space in which the user activity is performed (for example, a specific room, a living room, a house, an office, or a specific region) may have various sizes. The processor 330 may acquire space information by simulating the indoor space based on the result of analysis of a plurality of raw images or depth images (with reference to images including information on the object distance, which can be captured using a plurality of image sensors) captured using the camera 320.

According to various embodiments of the disclosure, the processor 330 may extract a plurality of feature points from the raw images through the camera 320 implemented as a single camera having one image sensor and may determine a depth of an image stream based on the extracted feature points. The processor 330 may acquire space information based on the depth of the image stream.

According to various embodiments of the disclosure, the processor 330 may determine the depth of the image stream through the camera 320 implemented as a dual camera having two or more image sensors and acquire space information based on the depth of the image stream.

According to various embodiments of the disclosure, the processor 330 may generate accurate space information based on space information received from the camera 320 and an external electronic device and manage the space model 362.

According to various embodiments of the disclosure, the electronic device 300 may identify information on a specific space based on the space model 362. For example, by identifying whether a space having specific coordinates is a living room or a study room, the electronic device 300 may map the function of the space into the space. In another example, the electronic device 300 may map the function of the space into the space through a simultaneous localization and mapping (SLAM) scheme. SLAM may refer, for example, to a scheme for estimating the map of the space and the current location while the electronic device 300 is moving in a preset space. In another example, the electronic device 300 may map the function of the space into the space according to user input of the electronic device 300 for inputting the function of the space (for example, user voice input or user input made through various input types, including input through a display).

The space information may be constructed using various pieces of additional information including user voice information indicating the space, an aerial view of a house, or tellurion information. Further, the electronic device 300 may acquire information related to movement of the electronic device 300 based on map information generated by the space model. The electronic device 300 may determine a target position (for example, the position at which the user activity is tracked) based on information related to movement, and may move to the target position. In order to move to the target position, the electronic device 300 may determine an optimal movement path in consideration of information on an object between an area of the current location and the target position.

According to various embodiments of the disclosure, the sound model 363 may be a model for storing information related to sounds generated by various objects. The electronic device 300 may define sound information related to a specific space or a specific activity and identify the user activity based on the sound information.

According to various embodiments of the disclosure, the electronic device 300 may collect surrounding sound information through the microphone 310 and generate the sound model 363 based on the collected information. The electronic device 300 may acquire a sound and a direction of the sound through the microphone 310 implemented as an array microphone for acquiring the sound and the output direction of the sound through a plurality of microphones facing various directions and generate sound information based on the sound and the output direction of the sound. The electronic device 300 may distinguish a sound source including information and a sound source which does not include information based on the sound model 363 and use the distinguishing information to additionally generate the sound model 363. The sound source including information may be, for example, a sound of opening a door, a sound of boiling water, a knock sound, voice information, or a sound made by another device. The sound source which does not include information may have a sound form such as noise or a sound of surrounding cars and may include a sound which is not used for information analysis.

According to various embodiments of the disclosure, the object model 364 may store the type of object that can be recognized by the electronic device 300 and feature information of an object.

According to various embodiments of the disclosure, the object model 364 may be generated and managed based on a range of the object recognized by the electronic device 300 and the type of the recognized object. In order to generate the object model 364, the electronic device 300 may recognize the object. The generation and management of the object model 364 may be performed using an image through the camera 320 or attribute information of the object received from the outside. The electronic device 300 may recognize the range of the object included in the raw image, extract features of the object based on the recognized range of the object, and store the extracted features in the object model 364.

According to various embodiments of the disclosure, the electronic device 300 may store location information of the identified object in the space model 362 through the object model 364 in an operation of generating or managing the space model 362. The location information of the identified object may be used for an operation of tracking the user activity and may increase the accuracy of identification of a space in which the user activity is performed.

According to various embodiments of the disclosure, when few objects are identified, the electronic device 300 may identify the space using the few identified objects, and the identified objects may increase the accuracy of the identification of the space in which the user activity is performed. When the object provides a communication function, the electronic device 300 may communicate with the object so as to acquire information on the object (for example, various pieces of information including the name of the object, location information of the object, and the state of the object) and generate and manage the object model 364 based on the acquired information on the object.

According to various embodiments of the disclosure, the electronic device 300 may identify the user or the user activity through at least one model of the user body data model 361, the space model 362, the sound model 363, and the object model 364, stored in the memory 360. The electronic device 300 may identify the user or the user activity through a combination of two or more of the plurality of models stored in the memory 360. When a combination of two or more models is used, a weighted value may be assigned to each model, and the electronic device 300 may determine the user activity based on information identified according to each model and the weighted value.

For example, when it is assumed that the user is in a living room and objects existing in the living room are a TV and piano, the electronic device 300 may identify the user based on the user body data model 361, identify the space in which the user is currently located based on the space model 362, and identify the objects (TV or piano) existing in the space in which the user is currently located based on the object model 364. In another example, when the user is in a kitchen and water is being boiled, the electronic device 300 may identify the user based on the user body data model 361, identify the space in which the user is currently located based on the space model 362, and identify the sound of boiling water based on the sound model 363. The electronic device 300 may determine that the user performs an activity related to cooking based on a plurality of models.

According to various embodiments of the disclosure, the activity model 365 may store the types of activity that the user can perform and data required to identify an activity (for example, information related to an environment in which the activity can be performed). The electronic device 300 may determine the user activity based on information identified using the user body data model 361, the space model 362, the sound model 363, the object model 364, and the activity model 365.

Figure 5:
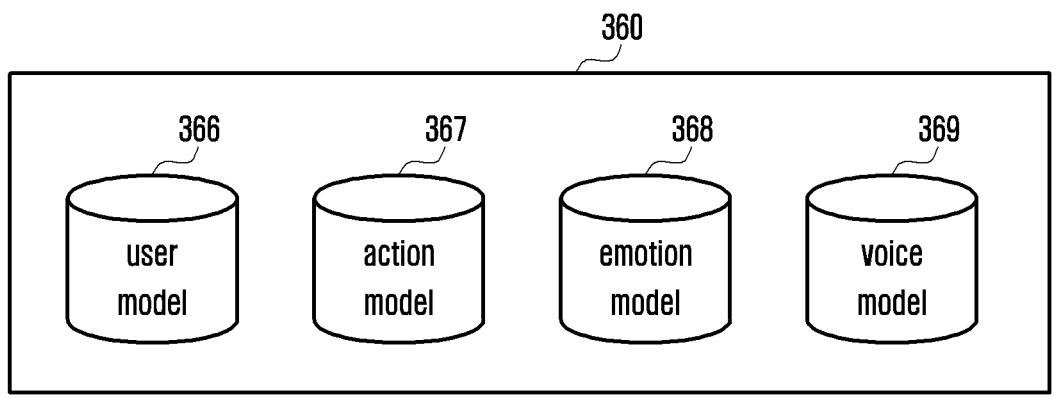
FIG. 5 is a diagram illustrating example models used to analyze an image captured to track user activity stored in the memory of the electronic device according to various embodiments of the disclosure.

FIG. 5 is a diagram illustrating example models used to analyze an image captured to track user activity stored in the memory of the electronic device according to various embodiments of the disclosure.

Referring to FIG. 5, a memory (for example, the memory 360 of FIG. 3) of an electronic device (for example, the electronic device 300 of FIG. 3) according to various embodiments of the disclosure may store models for processing an image acquired using a camera (for example, the camera 320 of FIG. 3).

According to various embodiments of the disclosure, a scene acquired using the camera 320 may be acquired during a process of tracking the user activity, and may be an image or a video corresponding to a preset time interval. The electronic device 300 may analyze the scene acquired using the camera 320 based on the models illustrated in FIG. 5. The electronic device 300 may group a plurality of scenes into scenes having continuity of the same activity based on the result of analysis of the scenes. The electronic device 300 may identify the activity by inputting the result of analysis of the scenes having the continuity of the same activity into the models illustrated in FIG. 4.

According to various embodiments of the disclosure, the models stored in the memory 360 may be generated by the electronic device 300 or may be generated by an external server connected to the electronic device 300 and transmitted to the electronic device 300.

According to various embodiments of the disclosure, the models stored in the memory 360 may include a user model (e.g., including data/information) 366, an action model (e.g., including data/information) 367, an emotion model (e.g., including data/information) 368, and a voice model (e.g., including data/information) 369.

According to various embodiments of the disclosure, the user model 366 may be a model including information on a user whose activity is to be tracked. The user model 366 may store various pieces of information that can be used to identify the user (for example, user's biometric information including the shape of the face of the user and the height of the user).

According to various embodiments of the disclosure, the action model 367 may include various processing circuitry and/or program elements and/or data/information and may acquire a body skeleton in the image acquired using the camera (for example, the camera 320 of FIG. 3) and identify the current position of the user based on the acquired body skeleton. The action model 367 may predict the next action of the user based on the current location and the current position of the user. The action model 367 may obtain relative direction information and relative distance information between the electronic device 300 and the user and acquire the location of the user based on the location of the electronic device 300, the relative direction information, and the relative distance information.

According to various embodiments of the disclosure, the emotion model 368 may include various processing circuitry and/or program elements and/or data/information and may analyze an area corresponding to a user's face among user information acquired using the object model (for example, the object model 364 of FIG. 4) and determine the user's emotion (for example, positive, negative, or neutral).

According to various embodiments of the disclosure, the voice model 369 may identify the user based on sound data acquired using the microphone (for example, the microphone 310 of FIG. 3). The voice model 369 may include various processing circuitry and/or program elements and/or data/information and may identify the user based on a determination result indicating whether the acquired sound data includes a frequency and a word corresponding to a voice of a specific user.

According to various embodiments of the disclosure, the models illustrated in FIG. 5 may be organically connected and used to analyze scenes. A description thereof will be made below with reference to FIGS. 7 to 12.

Figure 6:
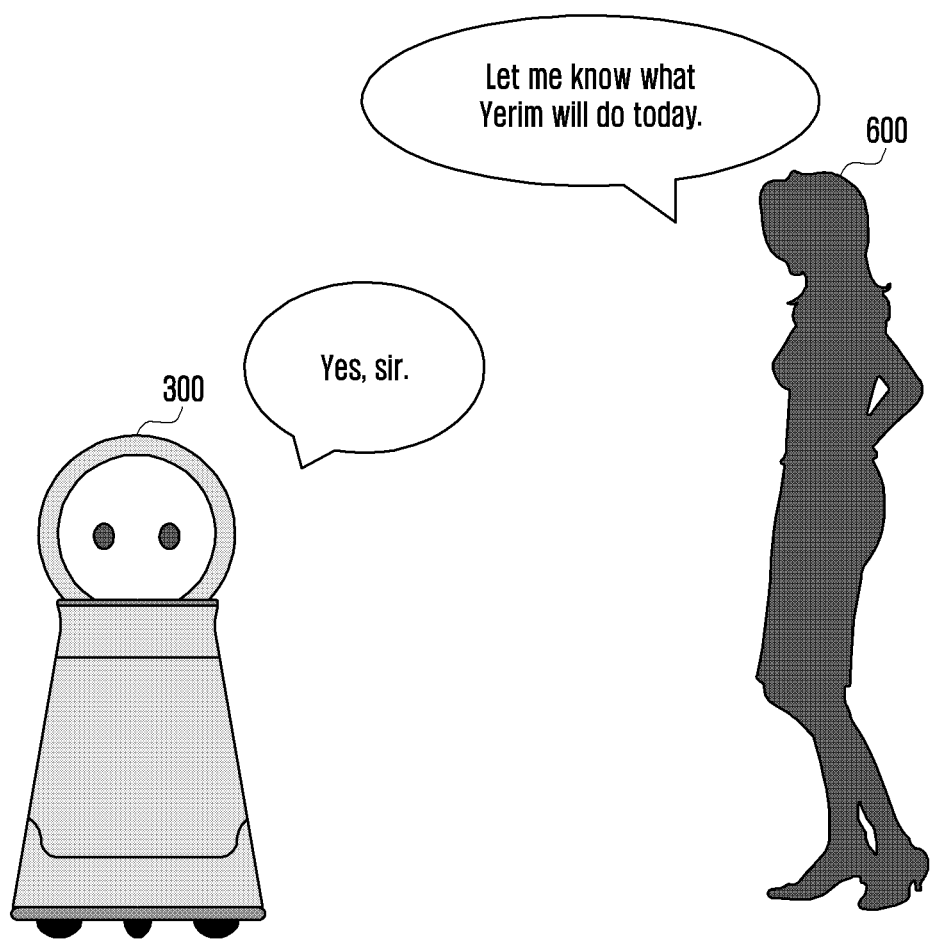
FIG. 6 is a diagram illustrating an example in which the electronic device receives user input according to various embodiments of the disclosure.

FIG. 6 is a diagram illustrating an example in which the electronic device receives user input according to various embodiments of the disclosure.

Referring to FIG. 6, through an electronic device (for example, the electronic device 300 of FIG. 3) according to various embodiments of the disclosure, a specific user 600 may receive an instruction for tracking an activity of another user whose activity is to be tracked. The electronic device 300 may receive an activity-tracking instruction through various methods using a user voice or a user interface. FIG. 6 illustrates an embodiment in which an activity-tracking instruction is received using a user voice.

User input for the activity-tracking instruction may include various pieces of information. According to various embodiments of the disclosure, the user input may include a request for tracking an activity of a target at a specific time. For example, the electronic device 300 may receive user input such as "Let me know what Yerim (target to be tracked) will do this afternoon" or "Let me know what Yerim will do from 9 to 11 o'clock", and the user input may include the time at which the activity is tracked.

According to various embodiments of the disclosure, the user input may include information designating the type of activity to be tracked. For example, the electronic device 300 may receive user input such as "Check if Yerim is playing piano" or "Check if Yerim is cooking", and the user input may include the type of activities.

According to various embodiments of the disclosure, the user input may include information designating a specific object. For example, the electronic device 300 may receive user input such as "Record Yerim playing the piano" or "Check if Yerim is watching a specific channel on a tablet", and the user input may include objects related to activity tracking.

According to various embodiments of the disclosure, the user input may include information on the location at which the user activity is tracked. The electronic device 300 may receive user input such as "Watch what Yerim is doing in the living room" or "Let me know when Yerim enters the kitchen", and the user input may include information on the location at which the user activity is tracked.

According to various embodiments of the disclosure, the user input may include movement information of a target whose activity is to be tracked. For example, the electronic device 300 may receive user input such as "Check if Yerim is practicing gymnastics" or "Check if Yerim is sleeping", and the user input may include motion information of the target to be tracked.

According to various embodiments of the disclosure, the user input may include information on a user executing an instruction. For example, the electronic device 300 may receive user input such as "Let me know what Yerim is doing while I am in the kitchen" or "Let me know what Yerim is doing while I am sleeping". The user input may include conditions related to the state of the user providing the instruction. The electronic device 300 may track the activity of a target based on a condition related to the state of the user included in the user input.

According to various embodiments of the disclosure, the user input may include information on the target to be tracked. The electronic device 300 may receive user input that makes a request for tracking activity based on information on the target to be tracked. For example, the electronic device 300 may receive user input that makes a request for tracking an activity based on information on the target to be tracked, such as "Record when Yerim feels good" or "Record when Yerim sings a song".

According to various embodiments of the disclosure, the electronic device 300 may move to the location at which the activity of the target to be tracked is tracked in response to reception of user input making a request for tracking the activity. The location of the electronic device 300 may be an area in which it is easy to track the activity of the target to be tracked, and additional configuration can be made, such as the location at which the target to be tracked is minimally distracted.

According to various embodiments of the disclosure, the electronic device 300 may track the activity of the target to be tracked in response to reception of the activity-tracking instruction.

Figure 7:
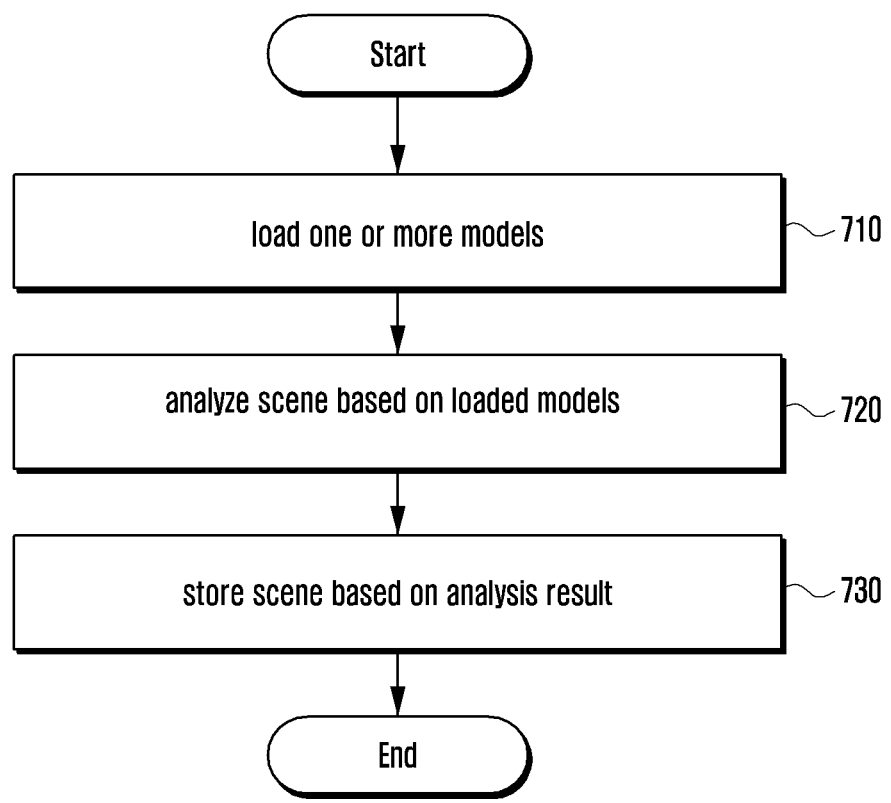
FIG. 7 is a flowchart illustrating an example operation in which the electronic device analyzes an image captured to track user activity according to various embodiments of the disclosure.

FIG. 7 is a flowchart illustrating an example operation 700 in which the electronic device analyzes an image captured to track user activity according to various embodiments of the disclosure.

The image corresponding to the target to be analyzed in FIG. 7 may be a plurality of scenes acquired using a camera (for example, the camera 320 of FIG. 3) during a process of tracking the user activity.

An electronic device (for example, the electronic device 300 of FIG. 3) according to various embodiments of the disclosure may load one or more models stored in a memory (for example, the memory 360 of FIG. 3) in operation 710. The model loaded in operation 710 may be the model illustrated in FIG. 4 or the model illustrated in FIG. 5. The model loaded in operation 710 may be used to analyze each of the plurality of scenes.

The electronic device 300 according to various embodiments of the disclosure may analyze each of the plurality of scenes based on the loaded model in operation 720. The models loaded in operation 710 may be organically connected to each other and may be used to analyze each of the plurality of scenes. The loaded models may be organically connected to each other and thus may interdependently operate, and may continuously store the result of analysis of the scenes of the user generated during a unit time. For example, the electronic device 300 may classify objects included in each of the plurality of scenes based on the object model 364. The electronic device 300 may determine whether an object included in the scene is a specific user based on the result of classification by the object model 364 and the user model 366. The electronic device 300 may determine the position of the object included in the scene based on the result of classification by the object model 364 and the action model 367 and predict an action of the object. An example embodiment of analyzing a plurality of scenes based on the loaded models will be described below with reference to FIGS. 8 to 12.

According to various embodiments, the electronic device 300 may determine a user (identified by the user model 366) included in each of a plurality of scenes, an action (identified by the action model 367) included in the scene, and an emotion (identified by the emotion model 368) included in the scene. The determination result may be added to each of the scenes.

According to various embodiments of the disclosure, the electronic device 300 may determine whether there is a scene that cannot be identified among the plurality of scenes. Scenes that cannot be identified may have an additional tag indicating non-identification. For example, the electronic device 300 may determine that a scene that can be identified is not to be identified according to user settings (for example, setting indicating no analysis for a scene including a specific action).

The electronic device 300 according to various embodiments of the disclosure may arrange and store the plurality of scenes based on the analysis result in operation 730.

For example, the number of scenes received by the electronic device 300 may be 4, the analysis result may be as shown in [Table 1] below, and the electronic device 300 may classify and store the analysis result according to a predefined order (for example, chronologically).

TABLE 1

|  | User model result | Space model result | Action model result | Emotion model result |
| --- | --- | --- | --- | --- |
| Scene 1 | Yerim | Living room | Reading | Unidentified |
| Scene 2 | Yerim | Study room | Playing piano | Positive |
| Scene 3 | Yerim | Kitchen | Eating banana | Positive |
| Scene 4 | Unidentified | Unidentified | Unidentified | Unidentified |

Figure 8:
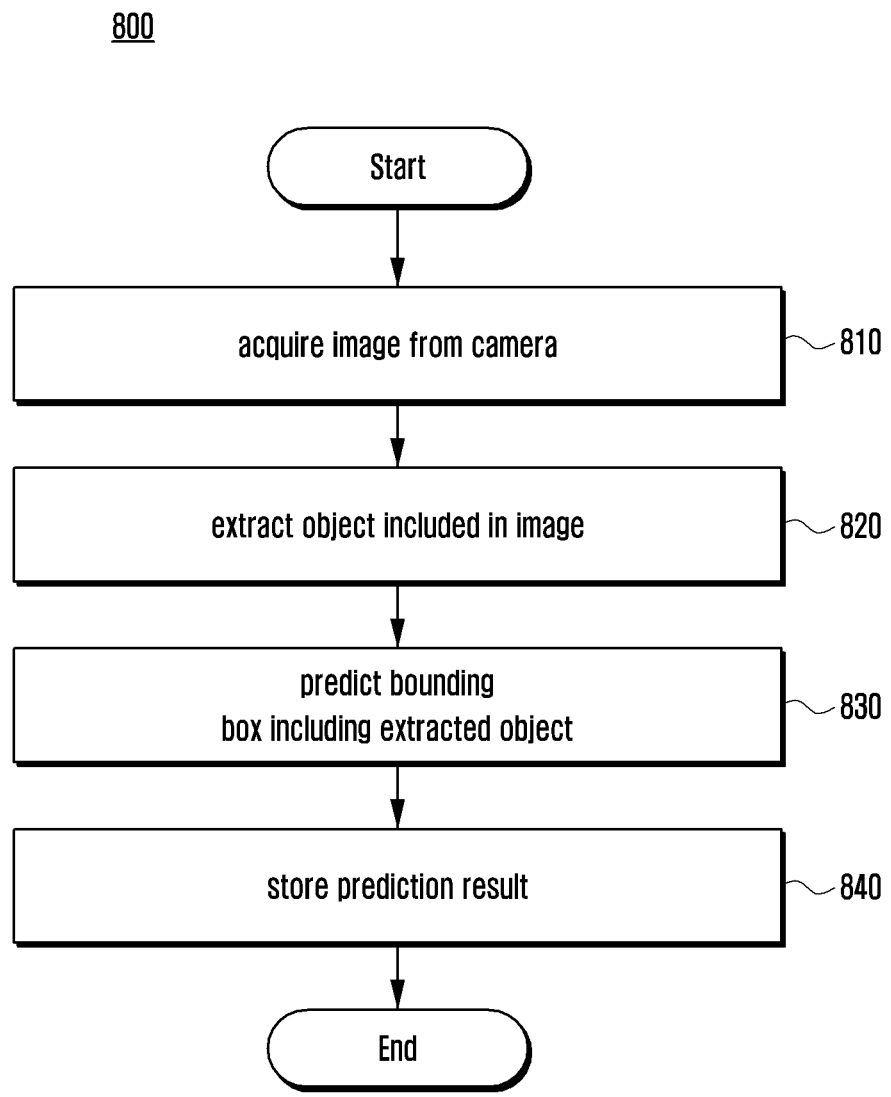
FIG. 8 is a flowchart illustrating an example operation in which the electronic device recognizes an object through an object model according to various embodiments of the disclosure.

FIG. 8 is a flowchart illustrating an example operation 800 in which the electronic device recognizes an object based on an object model according to various embodiments of the disclosure.

Referring to FIG. 8, an electronic device (for example, the electronic device 300 of FIG. 3) according to various embodiments of the disclosure may acquire an image through a camera (for example, the camera 320 of FIG. 3) in operation 810. The acquired image may be a raw image captured through the camera 320 or an image processed by an image processor dynamically connected to the camera 320.

The electronic device 300 according to various embodiments of the disclosure may extract an object included in the image in operation 820.

The electronic device 300 according to various embodiments of the disclosure may predict a bounding box including the extracted object in operation 830. The bounding box may, for example, be an area having a box shape surrounding the object included in the image. The electronic device 300 may distinguish different objects through the bounding box surrounding the object included in the image.

The electronic device 300 according to various embodiments of the disclosure may store the prediction result in operation 840. The predicted result may be used for analysis using another model. For example, information on the bounding box predicted by the user model 366 may be transmitted, and the user model 366 may predict a user based on the information on the bounding box. In another example, information on the bounding box predicted by the action model 367 may be transmitted, and the action model 367 may predict an action of the user based on the information on the bounding box. The models loaded in operation 710 may be organically connected to each other and may be used to analyze each of a plurality of scenes. The loaded models may be organically connected to each other and thus may interdependently operate, and may continuously store the result of analysis of the scenes of the user generated during a unit time.

Figure 9:
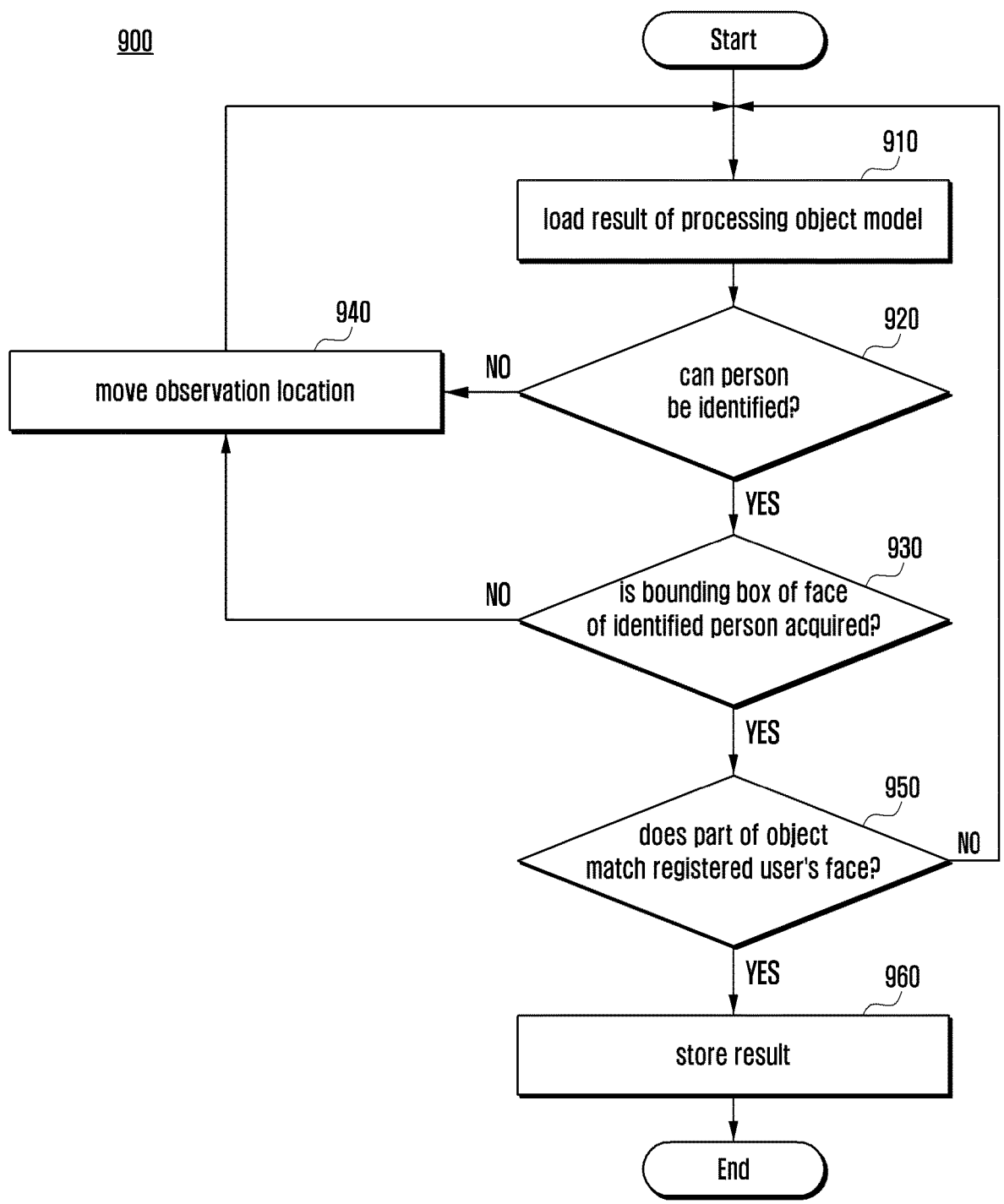
FIG. 9 is a flowchart illustrating an example operation in which the electronic device recognizes a user through a user model according to various embodiments of the disclosure.

FIG. 9 is a flowchart illustrating an example operation 900 in which the electronic device recognizes a user through a user model according to various embodiments of the disclosure.

Referring to FIG. 9, an electronic device (for example, the electronic device 300 of FIG. 3) according to various embodiments of the disclosure may load the result of processing the object model 364 in operation 910. The result of processing the object model 364 may be the result of distinguishing objects included in the image.

The electronic device 300 according to various embodiments of the disclosure may identify the result of analysis of the objects included in the result of processing the object model 364 and determine whether a person can be identified therein in operation 920.

When a person can be identified, the electronic device 300 according to various embodiments of the disclosure may identify whether a bounding box of a face is successfully acquired in operation 930.

When a person cannot be identified or when acquisition of a bounding box of a face of the person fails, the electronic device 300 according to various embodiments of the disclosure may change a viewing location of the electronic device 300 in operation 940. The change in the viewing location of the electronic device 300 will be described below with reference to FIG. 13.

When the bounding box of the face of the person is successfully acquired, the electronic device 300 according to various embodiments of the disclosure may identify a part of an object within the bounding box and identify whether the part of the object matches a registered user's face in operation 950. The electronic device 300 may determine the identity of the user corresponding to the object by performing an operation for identifying whether the part of the object matches the registered user's face. The electronic device 300 may perform operations 910 to 940 in response to identification that the part of the object does not match the registered user's face.

The electronic device 300 according to various embodiments of the disclosure may store the result of determination of the user model 366 in response to identification that the part of the object matches the registered user's face in operation 960.

Figure 10:
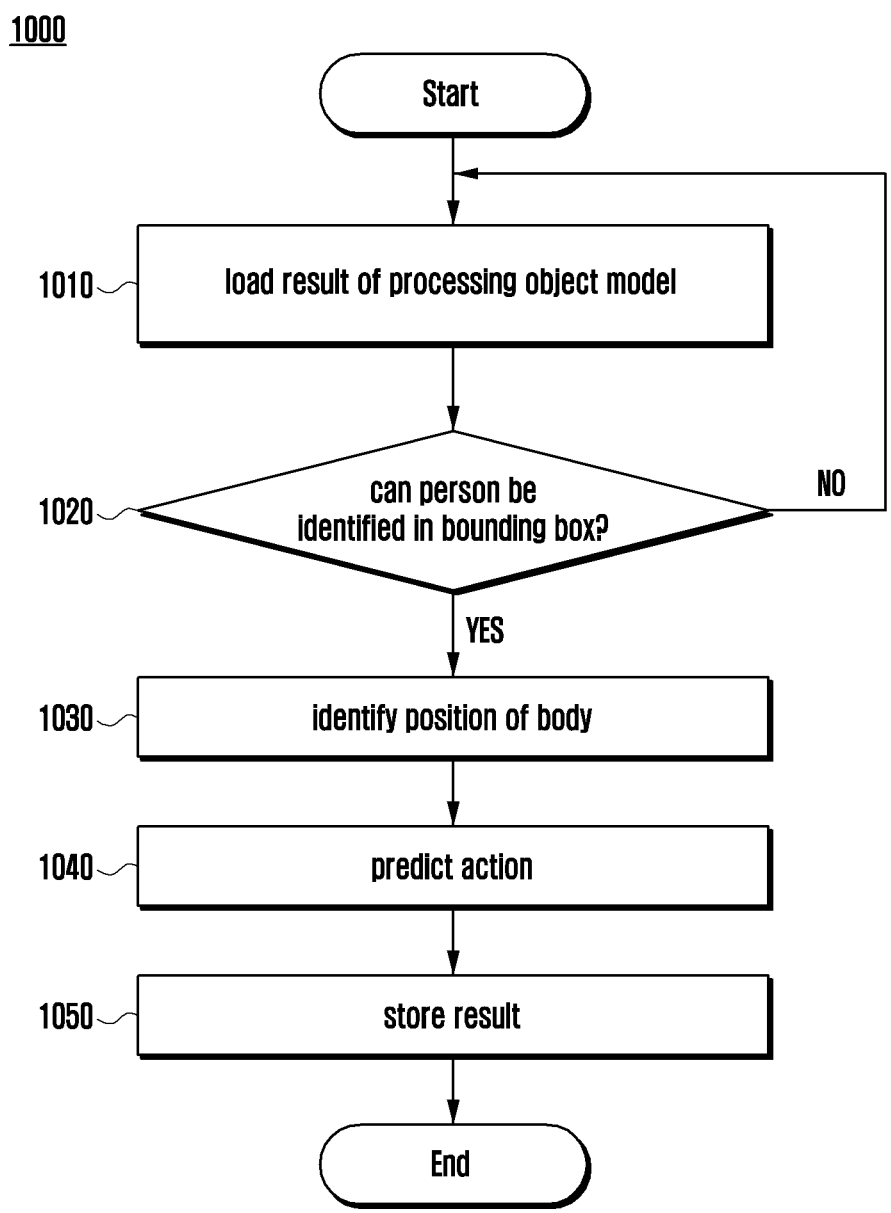
FIG. 10 is a flowchart illustrating an example operation in which the electronic device analyzes a user action through an action model according to various embodiments of the disclosure.

FIG. 10 is a flowchart illustrating an example operation 1000 in which the electronic device analyzes a user action through an action model according to various embodiments of the disclosure.

Referring to FIG. 10, an electronic device (for example, the electronic device 300 of FIG. 3) according to various embodiments of the disclosure may load the result of processing the object model 364 in operation 1010. The result of processing the object model 364 may be the result of distinguishing objects included in the image.

The electronic device 300 according to various embodiments of the disclosure may identify a bounding box included in the result of processing the object model 364 and identify whether there is a person in the bounding box in operation 1020. When it is determined that there is no person in the bounding box, the electronic device 300 may return to operation 1010 and wait for transmission of the result of the object model 364.

The electronic device 300 according to various embodiments of the disclosure may identify the position of the body in response to identification that there is a person in the bounding box in operation 1030. The electronic device 300 may identify the position of the body by identifying the body skeleton of the object within the bounding box and identifying position information corresponding to the body skeleton included in the action model 367.

The electronic device 300 according to various embodiments of the disclosure may predict an action of the person in operation 1040. The electronic device 300 may identify the current location of the person through the space model (for example, the space model 362 of FIG. 4) and predict an action of the person using a program that implements data, obtained by combining the current location and the position information of the person, in a deep-learning (for example, dense-net) type.

The electronic device 300 according to various embodiments of the disclosure may store the result including information on the predicted action in operation 1050.

Figure 11:
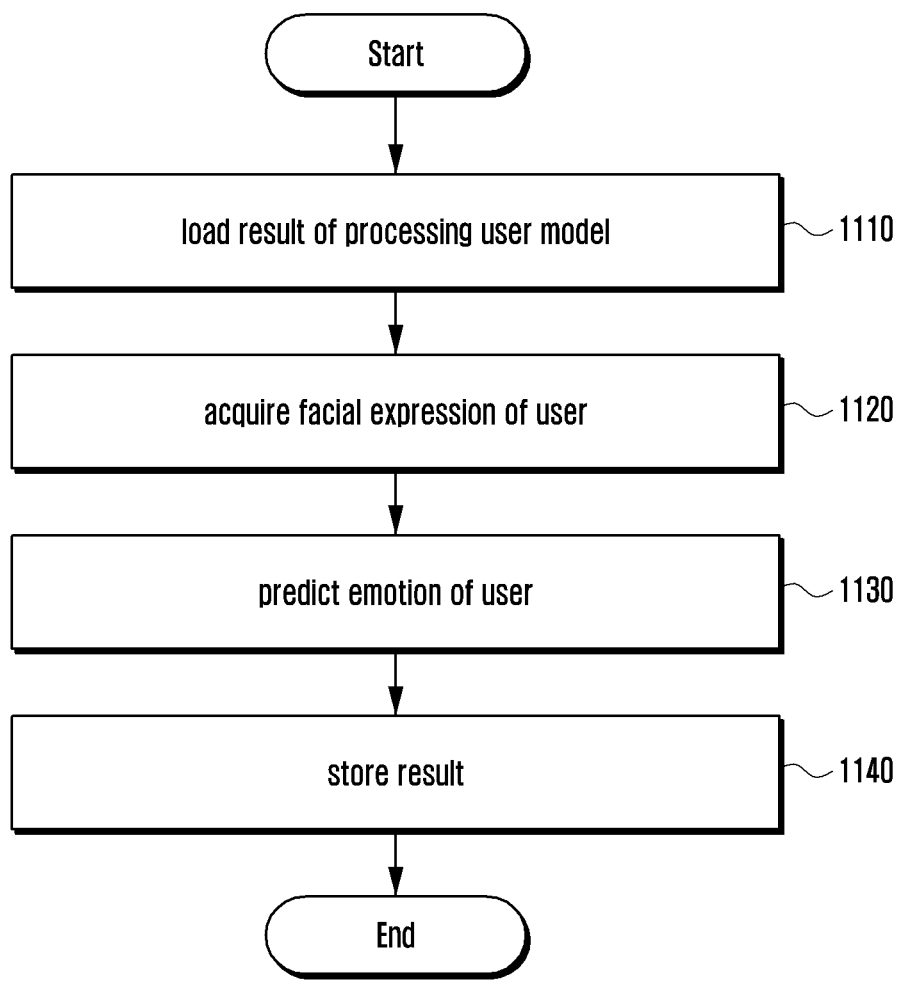
FIG. 11 is a flowchart illustrating an example operation in which the electronic device analyzes an emotion of the user through an emotion model according to various embodiments of the disclosure.

FIG. 11 is a flowchart illustrating an example operation 1100 in which the electronic device analyzes a user's emotion though an emotion model according to various embodiments of the disclosure.

Referring to FIG. 11, an electronic device (for example, the electronic device 300 of FIG. 3) according to various embodiments of the disclosure may load the result of processing a user model (for example, the user model 366 of FIG. 5) in operation 1110.

According to various embodiments of the disclosure, the result of processing the user model 366 may include information indicating that an object included in a scene corresponds to a specific user and an image corresponding to a face of the object.

The electronic device 300 according to various embodiments of the disclosure may acquire a facial expression of the user based on the result of the user model in operation 1120. The electronic device 300 may analyze a partial area of the image corresponding to the user's face included in the result of processing the user model 366 through an emotion model (for example, the emotion model 368 of FIG. 5).

The electronic device 300 according to various embodiments of the disclosure may predict a user's emotion based on the result of analysis of the facial expression of the user in operation 1130.

The electronic device 300 according to various embodiments of the disclosure may store the result of the predicted user's emotion in operation 1140.

Figure 12:
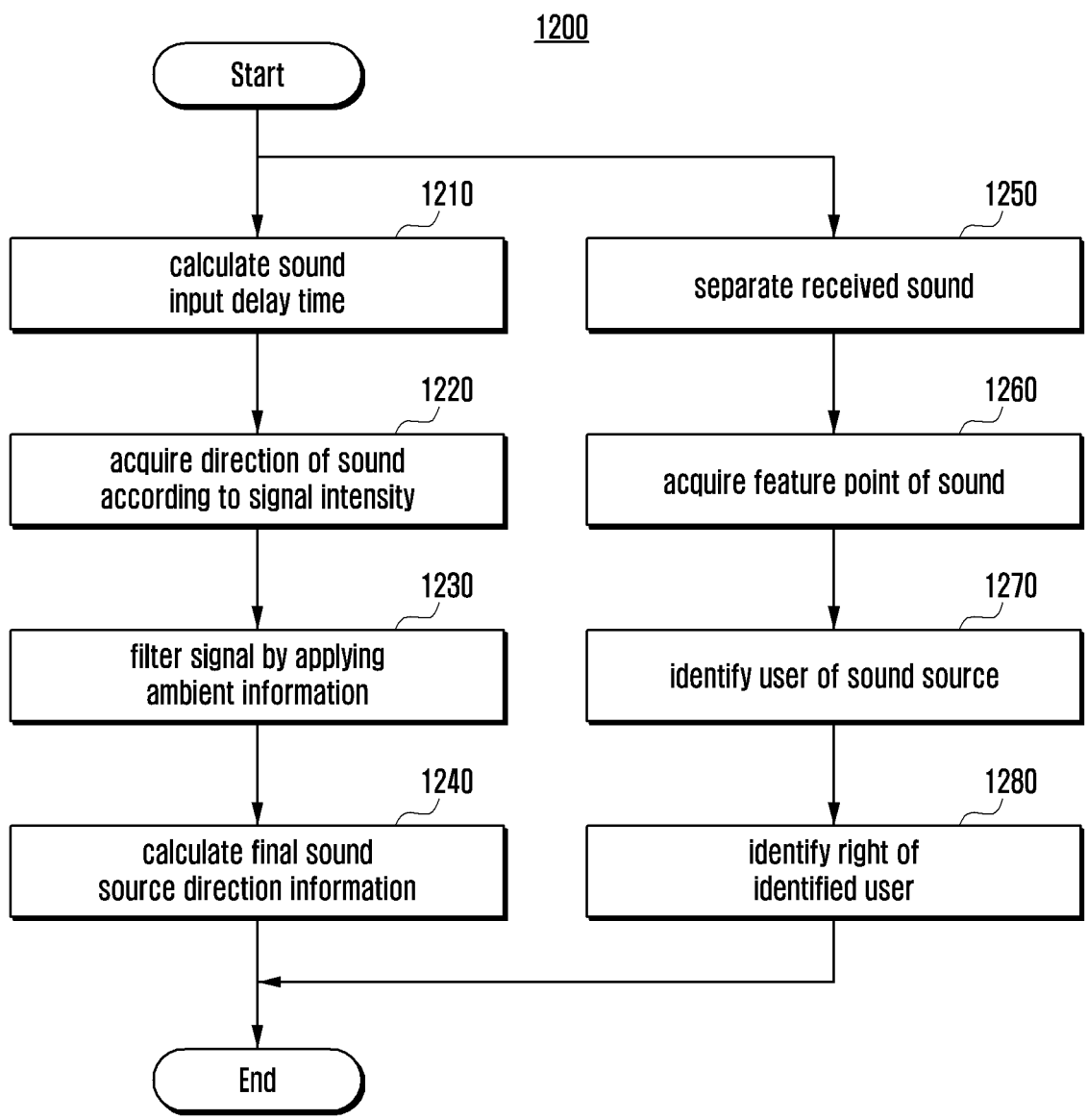
FIG. 12 is a flowchart illustrating an example operation in which the electronic device tracks user activity through a voice model according to various embodiments of the disclosure.

FIG. 12 is a flowchart illustrating an example operation 1200 in which the electronic device identifies a user included in a voice through a voice model according to various embodiments of the disclosure.

Referring to FIG. 12, an electronic device (for example, the electronic device 300 of FIG. 3) according to various embodiments of the disclosure may calculate an input delay time of a sound when the sound is acquired using a microphone (for example, the microphone 310 of FIG. 3) in operation 1210.

According to various embodiments of the disclosure, the microphone 310 may be implemented as a directional microphone facing a specific direction (for example, a microphone array including a plurality of microphones). In this example, the same sound may be received by the plurality of microphones at different times. The electronic device 300 may identify the time at which each of the plurality of microphones receives the sound and calculate an input delay time of the sound in operation 1210.

The electronic device 300 according to various embodiments of the disclosure may acquire the direction of the sound according to the intensity of a signal corresponding to the sound in operation 1220. The direction of the sound may be acquired, for example, and without limitation, by calculating a Direction of Arrival (DOA).

According to various embodiments of the disclosure, the electronic device 300 may determine the direction of the sound and control the microphone 310 to receive the sound output in the determined direction of the sound.

The electronic device 300 according to various embodiments of the disclosure may filter the signal corresponding to the sound by applying ambient information in operation 1230.

The electronic device 300 according to various embodiments of the disclosure may determine the direction of the sound source that outputs the sound based on the filtered signal in operation 1240.

The electronic device 300 according to various embodiments of the disclosure may separate the received sound in operation 1250. The electronic device 300 may separate the received sound according to each frequency band and separate the sound output from each of a plurality of sound sources (for example, a target to be tracked or a user may be each of the sound sources). Operation 1250 may be processed in parallel with operation 1210.

The electronic device 300 according to various embodiments of the disclosure may acquire a feature point for each of the separated sounds in operation 1260.

The electronic device 300 according to various embodiments of the disclosure may identify a user corresponding to each of the sound sources based on the acquired feature points in operation 1270.

The electronic device 300 according to various embodiments of the disclosure may identify a right corresponding to each of the identified users in operation 1280.

According to various embodiments of the disclosure, the electronic device 300 may receive various voice instructions while the activity of the target to be tracked is being tracked. The electronic device 300 may accurately receive and process a user's voice instruction by performing operations 1250 to 1280 to receive various voice instructions. For example, the electronic device 300 may receive a voice instruction having a higher priority than tracking of the activity while the activity of the target to be tracked is being tracked. The electronic device 300 may stop tracking the activity and perform a task corresponding to the voice instruction in response to reception of the voice instruction having a higher priority.

Figure 13:
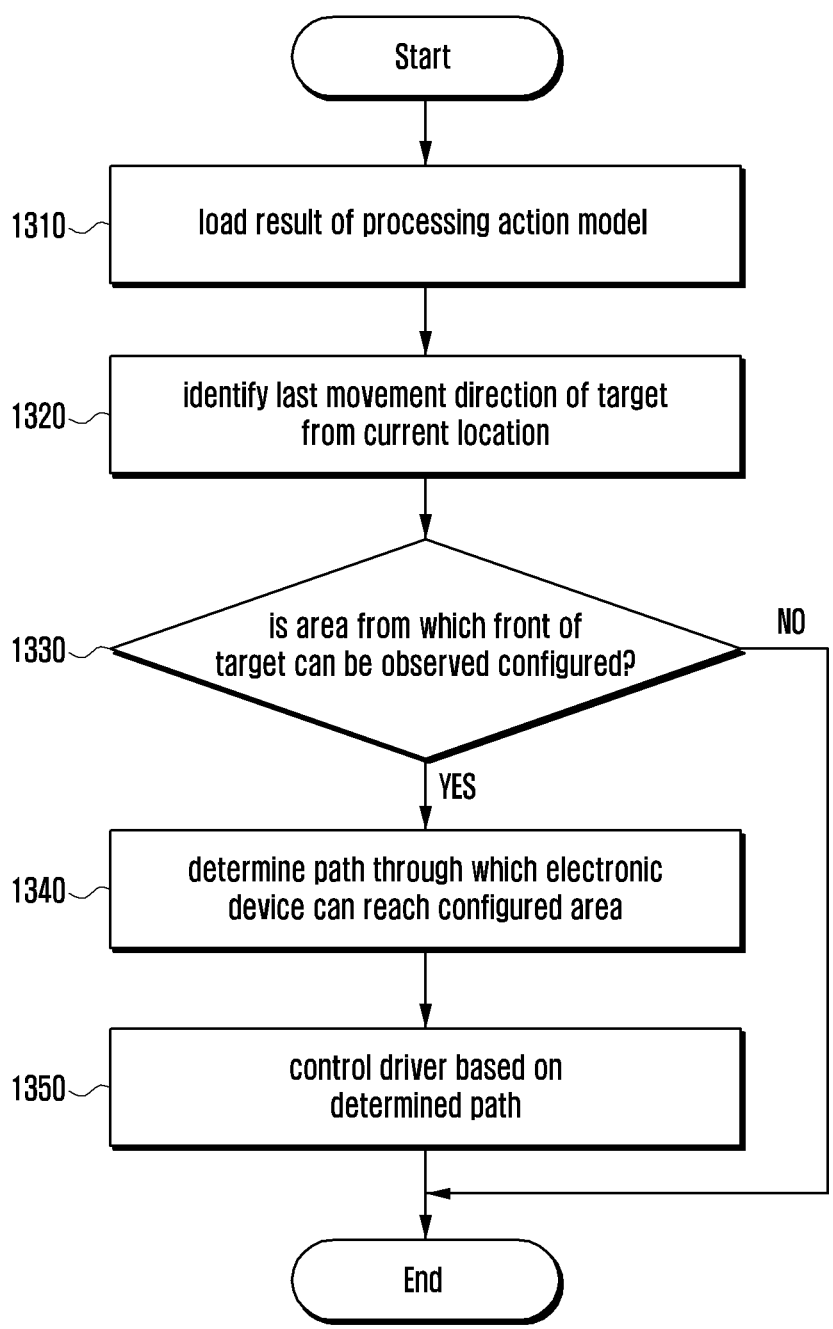
FIG. 13 is a flowchart illustrating an example operation in which the electronic device changes the location at which a user is observed in order to track user activity according to various embodiments of the disclosure.

FIG. 13 is a flowchart illustrating an example operation 1300 in which the electronic device changes the location from which a user is observed in order to track the activity of the user according to various embodiments of the disclosure.

According to various embodiments of the disclosure, the electronic device 300 may determine the initial location from which to track the activity of the target to be tracked and control a driver (for example, the driver 350 of FIG. 3) to move to the initial location. After moving to the determined location, the electronic device 300 may track the activity of the target to be tracked. The electronic device 300 may change the location from which the activity is tracked due to the occurrence of various situations while the activity of the target to be tracked is being tracked. For example, the change in the location may be generated due to a change in the activity of the target to be tracked, due to movement of the target to be tracked, or due to processing of another task having a higher priority than tracking of the activity of the target to be tracked. FIG. 13 illustrates an embodiment of changing the location from which an activity is tracked due to the occurrence of various situations.

Referring to FIG. 13, an electronic device (for example, the electronic device 300 of FIG. 3) according to various embodiments of the disclosure may load the result of processing an action model (for example, the action model 367 of FIG. 5) in operation 1310.

The electronic device 300 according to various embodiments of the disclosure may identify the last movement direction of the target to be tracked from the current location of the electronic device 300 in operation 1320.

The electronic device 300 according to various embodiments of the disclosure may determine whether an area in which the front of the target to be tracked can be observed is configured in operation 1330. The electronic device 300 may load one or more of a space model (for example, the space model 362 of FIG. 4), a sound model (for example, the sound model 363 of FIG. 4), or an object model (for example, the object model 364 of FIG. 4) and configure an area in which the front of the target to be tracked can be observed through the loaded models.

According to various embodiments of the disclosure, the area in which the front of the target to be tracked can be observed may be an area in which the action of the target to be tracked is not disturbed while the front of the target to be tracked can be observed.

According to various embodiments of the disclosure, the electronic device 300 may detect the occurrence of a situation in which it is difficult to continuously track the target to be tracked. The situation in which it is difficult to continuously track the target to be tracked may include the case in which the target to be tracked moves or the case in which the target to be tracked is hidden by another object. The electronic device 300 may configure the area in which the front of the target to be tracked can be observed within a range in which the activity of the target to be tracked is not disturbed. For example, the electronic device 300 may identify the center of gravity of a hidden object in response to detection of the target to be tracked, hidden by another object. The electronic device 300 may identify the center of gravity of the hidden object and determine a movement path along which to move the electronic device 300 in a direction away from the center of gravity thereof. The electronic device 300 may change the area from which the front of the target to be tracked can be observed to place the center of gravity of the target to be tracked at the center of the image acquired through the camera 320.

According to various embodiments of the disclosure, the electronic device 300 may detect the occurrence of a situation in which it is difficult to continuously track the target to be tracked due to a change in an optical condition. The optical condition that can be generated may include a condition corresponding to backlight or a reduction in the amount of light that can be generated while the activity of the target to be tracked is being tracked. The electronic device 300 may determine the area from which the front of the target to be tracked can be observed based on the current date, the current time, the target to be tracked, and the location of the electronic device 300.

The electronic device 300 according to various embodiments of the disclosure may determine a path through which the electronic device 300 can reach the configured area from which the front of the target to be tracked can be observed in operation 1340. The electronic device 300 may load one or more of the space model 362, the sound model 363, or the object model 364 and determine the path along which the electronic device 300 is to move to the area in which the front of the target to be tracked can be observed through the loaded models.

According to various embodiments of the disclosure, the electronic device 300 may identify the last location of the target to be tracked and determine the shortest distance to the front of the target to be tracked.

The electronic device 300 according to various embodiments of the disclosure may control the driver 350 to move to the determined path and may track the activity of the target to be tracked after movement.

According to various embodiments of the disclosure, the electronic device 300 may continuously track the movement of the target to be tracked and may continuously move such that the target to be tracked is captured on the camera 320 of the electronic device 300. When the target to be tracked is not detected by the camera 320, the electronic device 300 may determine a place to which the target to be tracked will move through the space model 362 and move to the determined location.

According to various embodiments of the disclosure, when the electronic device 300 moves to the determined location and has difficulty securing an image of the target to be tracked, the electronic device 300 may acquire an image of a partial area of the target to be tracked in order to track the activity of the target to be tracked instead of changing the location. The priority may, for example, and without limitation, be defined as shown in [Table 2] below.

TABLE 2

| Priority 1 | Image including the face of the target to be tracked, the whole body of the target to be tracked, or an object around the target to be tracked |
| Priority 2 | Image including the face of the target to be tracked or the whole body of the target to be tracked |
| Priority 3 | Image including the face of the target to be tracked or the hands of the target to be tracked |
| Priority 4 | Image including the face of the target to be tracked |

According to various embodiments of the disclosure, when the electronic device 300 cannot acquire an image from which the activity of the target to be tracked can be tracked, the electronic device 300 may search for an external electronic device capable of tracking the activity of the target to be tracked among objects around the target to be tracked. When the electronic device 300 successfully found an external electronic device capable of tracking the activity of the target to be tracked, the electronic device 300 may control the external electronic device to track the activity of the target to be tracked. The electronic device 300 may track the activity of the target to be tracked by receiving data related to tracking of the activity of the target to be tracked transmitted by the external electronic device.

Figure 14:
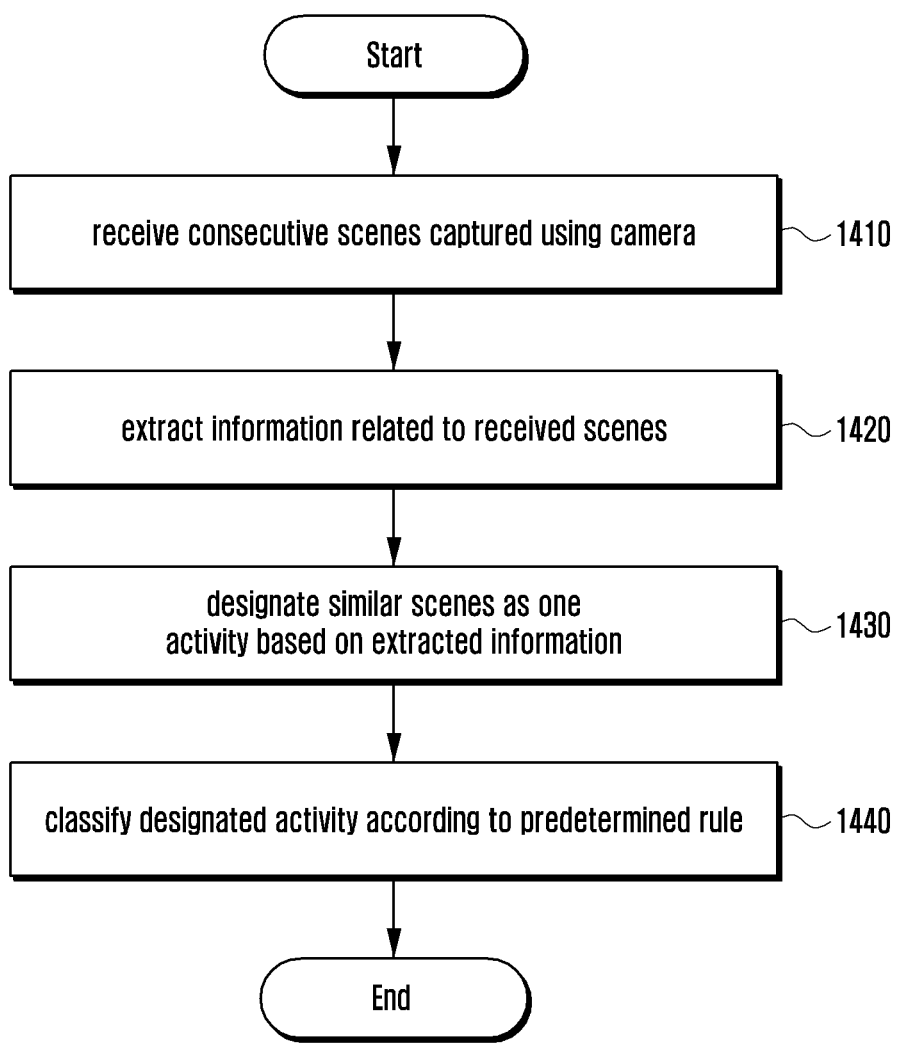
FIG. 14 is a flowchart illustrating an example operation in which the electronic device analyzes user activity based on a captured image according to various embodiments of the disclosure.

FIG. 14 is a flowchart illustrating an operation 1400 in which the electronic device analyzes a user activity based on a captured image according to various embodiments of the disclosure.

Referring to FIG. 14, an electronic device (for example, the electronic device 300 of FIG. 3) according to various embodiments of the disclosure may receive consecutive scenes captured using a camera (for example, the camera 320 of FIG. 3) in operation 1410.

According to various embodiments of the disclosure, the electronic device 300 may extract information related to the received scenes in operation 1420.

According to various embodiments of the disclosure, the electronic device 300 may extract the information related to the received scenes through an object model (For example, the object model 364 of FIG. 4), a user model (for example, the user model 366 of FIG. 5), an action model (for example, the action model 367 of FIG. 5), or an emotion model (for example, the emotion model 368 of FIG. 5).

According to various embodiments of the disclosure, the information related to the received scenes may include information on the user included in the received scene, a place included in the received scene, information on an action of the user included in the received scene, and an emotion included in the received scene. The information related to the received scenes may, for example, and without limitation, be stored in the form of [Table 3] below.

TABLE 3

| Scene 1 | Yerim | Living room | Reading | Unidentified |
| Scene 2 | Yerim | Living room | Reading | Unidentified |
| Scene 3 | Yerim | Study room | Playing piano | Positive |
| Scene 4 | Yerim | Study | Playing piano | Positive |

According to various embodiments of the disclosure, the electronic device 300 may designate or group similar scenes based on the extracted information and designate the grouped similar scenes as one activity in operation 1430.

According to various embodiments of the disclosure, the electronic device 300 may group similar scenes among a plurality of scenes based on information related to each of the plurality of scenes. The electronic device 300 may group similar scenes among the plurality of scenes based on a user action (for example, reading or playing the piano) included in the information related to the plurality of scenes and designate the grouped similar scenes as one activity. The grouped similar scenes may have a continuity relationship therebetween. Continuity may be the extent of sameness of activities that the user performs.

[Table 4] illustrates and example of the result obtained by grouping the scenes in [Table 3] and designating the scenes as activities.

TABLE 4

| Activity 1 | Scene 1 | Yerim | Living room | Reading | Unidentified |
|---|---|---|---|---|---|
| | Scene 2 | Yerim | Living room | Reading | Unidentified |
| Activity 2 | Scene 3 | Yerim | Study room | Playing piano | Positive |
| | Scene 4 | Yerim | Study room | Playing piano | Positive |

According to various embodiments of the disclosure, the electronic device 300 may classify and store the designated activities according to the rule in operation 1440. The classified and designated activities may be provided to the user in various forms in response to a user request.

Figure 15:
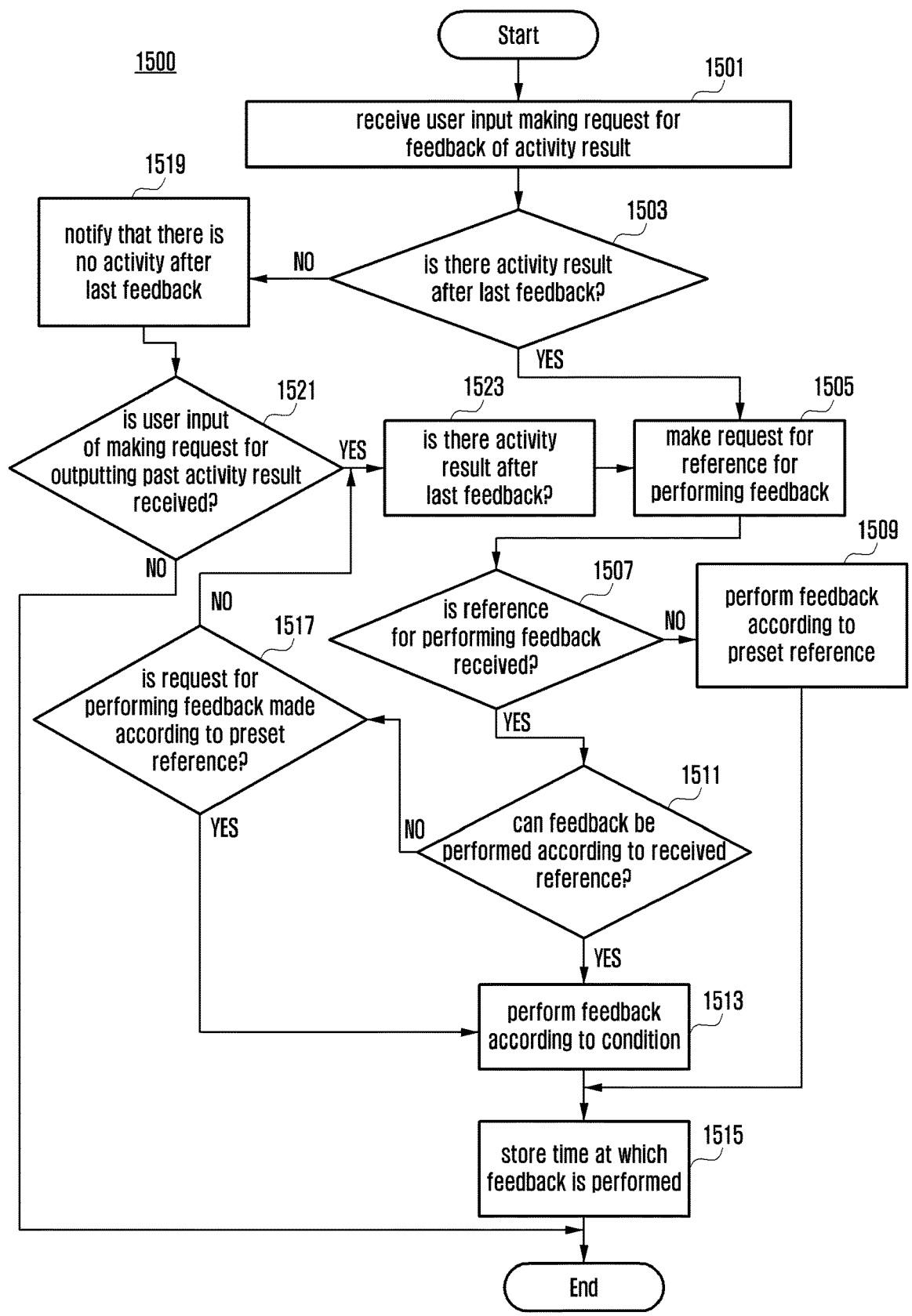
FIG. 15 is a flowchart illustrating an example operation in which the electronic device outputs the result of user activity according to various embodiments of the disclosure.

FIG. 15 is a flowchart illustrating an example operation in which the electronic device outputs the result of a user activity according to various embodiments of the disclosure.

An electronic device (for example, the electronic device 300 of FIG. 3) according to various embodiments of the disclosure may track an activity of a target to be tracked and store the tracking result in a memory (for example, the memory 360 of FIG. 3).

According to various embodiments of the disclosure, the tracking result may be successively stored chronologically. [Table 5] below illustrates an embodiment of storing the tracking result.

TABLE 5

| Activity | Start time | End time | User | Location | Action | Emotion |
|---|---|---|---|---|---|---|
| 1 | yy.mm.dd 12:00:00 | yy.mm.dd 13:00:00 | Yerim | Living room | Reading | Neutral |
| 2 | yy.mm.dd 13:00:00 | yy.mm.dd 14:00:00 | Yerim | Kitchen | Eating | Positive |
| 3 | yy.mm.dd 14:00:00 | yy.mm.dd 16:00:00 | Yerim | Study room | Playing piano | Positive |
| 4 | yy.mm.dd 16:00:00 | yy.mm.dd 17:00:00 | Yerim | Living room | Playing with ball | Neutral |

The electronic device 300 according to various embodiments of the disclosure may output the activity result in various forms in response to a request from the user. For example, the electronic device 300 may process the activity result in a natural language form according to the request from the user and output the processing result.

FIG. 15 is a flowchart illustrating an example operation 1500 of outputting the activity result.

The electronic device 300 according to various embodiments of the disclosure may receive user input that makes a request for feedback of the activity result in operation 1501. The user input may be received through various schemes including a voice or a touch input using a user interface.

According to various embodiments of the disclosure, the electronic device 300 may actively identify whether to make a request for feedback of the activity result when the user is away for a specified time.

The electronic device 300 according to various embodiments of the disclosure may identify whether there is an activity result after the last feedback in response to reception of user input requesting feedback of the activity result in operation 1503. The activity after the last feedback may be an activity that has not been fed back to the user yet.

The electronic device 300 according to various embodiments of the disclosure may make a request for a reference for feeding back the activity result in operation 1505. The electronic device 300 may make a request for the reference for feeding back the activity result to the user through a speaker (not shown) or a user interface and induce the user to input the reference for feeding back the activity result.

According to various embodiments of the disclosure, the reference for performing feedback may include a time, a specific event, and an emotion.

The electronic device 300 according to various embodiments of the disclosure may identify whether the reference for feeding back the activity result is received in operation 1507.

The electronic device 300 according to various embodiments of the disclosure may perform the feedback according to a preset reference in response to identification of non-reception of the reference for feeding back the activity result in operation 1509.

According to various embodiments of the disclosure, the preset reference may be various references for outputting the activity result in a natural language form. For example, the preset reference may include a time, a specific event, or an emotion reference.

The electronic device 300 according to various embodiments of the disclosure may identify whether the activity result can be fed back according to the received reference in response to identification of reception of the reference for feeding back the activity result in operation 1511. For example, when the electronic device 300 receives another reference rather than the reference for classifying the activity result, the electronic device 300 may determine that the activity result cannot be fed back. In another example, when the electronic device 300 receives the same reference as the reference for classifying the activity result, the electronic device 300 may determine that the activity result can be fed back.

The electronic device 300 according to various embodiments of the disclosure may perform the feedback according to the received condition in response to identification that the activity result can be fed back according to the received reference in operation 1513.

The electronic device 300 according to various embodiments of the disclosure may store the time at which the electronic device 300 feeds back the activity result in operation 1515.

The electronic device 300 according to various embodiments of the disclosure may make a request for performing the feedback according to a preset reference in response to identification that the activity result can be fed back according to the received reference in operation 1517. The electronic device 300 may make a request for feeding back the activity result according to the preset reference to the user through a speaker (not shown) or a user interface and induce the user to make a user input. The electronic device 300 may proceed to operation 1513 and feed back the activity result according to the preset condition in response to reception of user input making a user request for performing the feedback according to the preset reference.

The electronic device 300 according to various embodiments of the disclosure may inform the user that there is no activity after the last feedback in operation 1519 in response to identification of the non-existence of the activity result after the last feedback in operation 1503.

The electronic device 300 according to various embodiments of the disclosure may identify whether user input that makes a request for outputting the past activity is received in operation 1521.

The electronic device 300 according to various embodiments of the disclosure may load the past activity result and perform operations 1505 to 1515 in response to reception of user input making a request for outputting the past activity in operation 1523.

The electronic device 300 according to various embodiments of the disclosure may provide the activity result in various forms, transmit the activity result to an external electronic device, and provide the activity result through the external electronic device. The above example embodiment will be described with reference to FIG. 16.

Figure 16:
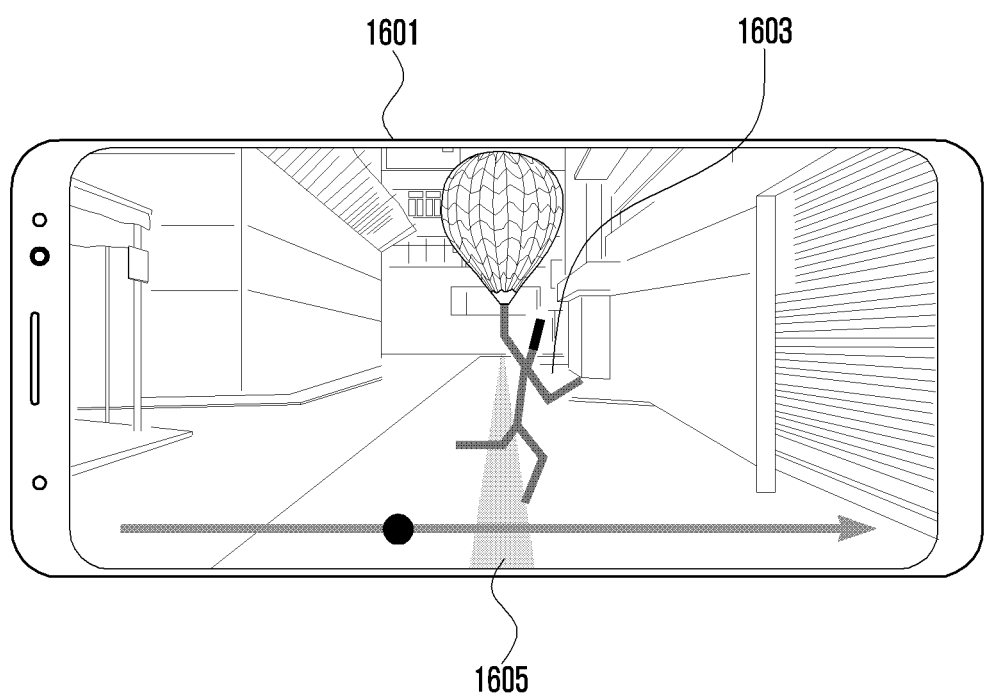
FIG. 16 is a diagram illustrating an example in which the electronic device outputs the result of user activity according to various embodiments of the disclosure.

FIG. 16 is a diagram illustrating an example in which the electronic device outputs the result of a user activity according to various embodiments of the disclosure.

For example, the electronic device 300 may transmit the activity result to an external electronic device 1601 and provide the activity result using, for example, an Augmented-Reality (AR) platform. The activity result may be sequentially provided chronologically and may provide various pieces of information including the movement path of the target to be tracked and the action of the target to be tracked.

Referring to FIG. 16, the external electronic device 1601 may receive the activity result from the electronic device 300 and provide the activity result using the augmented-reality platform. The external electronic device 1601 may output a movement path or an activity history of a target 1603 to be tracked on a display in chronological order 1605.

An electronic device according to various example embodiments of the disclosure may include: a housing; a user interface; at least one microphone disposed in the housing; at least one camera disposed in the housing; at least one driver comprising driving circuitry connected to or disposed in the housing and configured to move the housing; a wireless communication circuit disposed within the housing; a processor operatively connected to the user interface, the microphone, the camera, the driver, and the wireless communication circuit; and a memory operatively connected to the processor, wherein the memory stores instructions which, when executed by the processor, control the electronic device to: acquire a voice and/or an image of a user through the microphone and/or the camera, identify the user based on the voice and/or the image, identify an activity of the user based on at least one piece of movement information of the identified user, location information, or information on an object that the user is using, determine a location from which to track the user based on the identified activity, control the driver to move the housing based at least in part on the determined location, track the activity of the user based on continuity of the activity after movement, and provide the result of the activity based on the tracking result.

In the electronic device according to various example embodiments of the disclosure, the instructions may, when executed by the processor, control the electronic device to: complete tracking of the activity of the user based on the continuity of the activity, classify the activity based on the tracking result, and provide a result thereof.

In the electronic device according to various example embodiments of the disclosure, the memory may store one or more models for recognizing an environment around the user and one or more models for recognizing the activity of the user, and the instructions may, when executed by the processor, control the electronic device to: acquire an image obtained by capturing the user through the at least one camera while the activity is tracked, determine the characteristics of the activity of the user through the acquired image and the models stored in the memory, and acquire the result of the activity of the user based on the characteristics of the activity of the user.

In the electronic device according to various example embodiments of the disclosure, the result of the activity of the user may include at least one of the place where the user is located while the user performs the activity, the type of the activity of the user, the time at which the user performs the activity, and the emotion of the user.

In the electronic device according to various example embodiments of the disclosure, the instructions may, when executed by the processor, control the electronic device to: identify the characteristics of the activity, determine the location from which to track the user and a movement range for tracking the user based on the characteristics of the activity, and control the driver to move the housing based on the location from which to track the user and the movement range.

In the electronic device according to various example embodiments of the disclosure, the identified characteristic of the activity may include a range of the location to which the user is expected to move while the user performs the activity.

In the electronic device according to various example embodiments of the disclosure, the instructions may, when executed by the processor, control the electronic device to: analyze an image acquired using the at least one camera while the activity of the user is tracked, determine whether the user can be identified based on a result of analysis of the acquired image, and determine whether the electronic device moves based at least partially on a result of the determination that the user cannot be identified.

In the electronic device according to various example embodiments of the disclosure, the instructions may, when executed by the processor, control the electronic device to: determine whether at least a body part of the user related to the activity can be identified based on a result of analysis of the acquired image and determine whether the electronic device moves based at least in part on a determination result indicating that at least the body part of the user related to the activity cannot be identified.

In the electronic device according to various example embodiments of the disclosure, the instructions may, when executed by the processor, control the electronic device to: identify whether there is an external electronic device capable of tracking the activity of the user in a space in which the user performs the activity and control the external electronic device to track the activity of the user based at least partially on the identification of whether there is an external electronic device.

In the electronic device according to various example embodiments of the disclosure, the instructions may, when executed by the processor, control the electronic device to determine to not move the housing based at least partially on the identification of whether there is an external electronic device.

In the electronic device according to various example embodiments of the disclosure, the instructions may, when executed by the processor, control the electronic device to: classify a result of the activity according to a preset condition, store the result in the memory, receive a user request for outputting the result of the activity, and provide at least a portion of the result of the activity corresponding to a condition included in the user request.

In the electronic device according to various example embodiments of the disclosure, the instructions may, when executed by the processor, control the electronic device to transmit at least the portion of the result of the activity to the external electronic device in order to provide at least the portion of the result of the activity through an augmented-reality platform.

Figure 17:
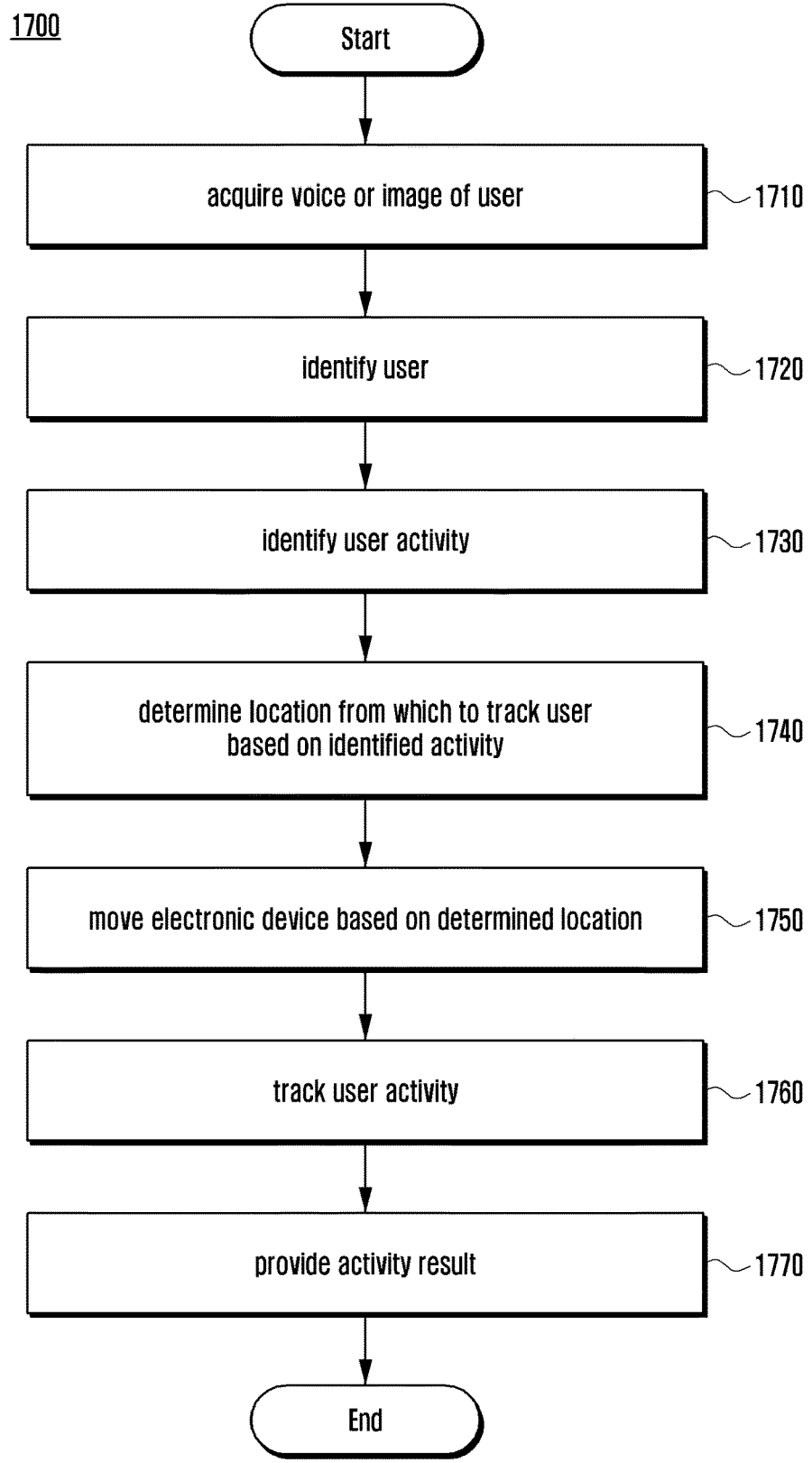
FIG. 17 is a flowchart illustrating an example method of operating the electronic device according to various embodiments of the disclosure.

FIG. 17 is a flowchart illustrating an example method 1700 of operating the electronic device according to various embodiments of the disclosure.

Referring to FIG. 17, in a method of operating an electronic device (for example, the electronic device 300 of FIG. 3) according to various embodiments of the disclosure, the electronic device 300 may acquire a voice or an image of a user in operation 1710.

According to various embodiments of the disclosure, the electronic device 300 may acquire a sound (for example, a voice of the user or a sound generated by an ambient object while the user performs an activity) generated while the user performs an activity through at least one microphone (for example, the microphone 310 of FIG. 3). The electronic device 300 may acquire an image obtained by capturing the user and an ambient object while the user performs the activity through at least one camera (for example, the camera 320 of FIG. 3).

According to various embodiments of the disclosure, the electronic device 300 may identify the user based on the acquired voice or image in operation 1720. The electronic device 300 may identify the user included in the voice through a voice model (for example, the voice model 369 of FIG. 5). The electronic device 300 may identify the user included in the image through a user model (for example, the user model 366 of FIG. 5).

According to various embodiments of the disclosure, the electronic device 300 may identify the user activity based on at least one piece of identified movement information or location information of the user, or information on an object that the user is using in operation 1730. The electronic device 300 may use various models including one or more models for recognizing an environment around the user and one or more models for identifying the user activity.

According to various embodiments of the disclosure, the electronic device 300 may determine the location from which to track the user based on the identified activity in operation 1740.

According to various embodiments of the disclosure, the determined location may include the location at which the user activity can be tracked or a range of the distance between the user and the electronic device 300 to track the user activity, and may correspond to a location from which it is easy to track the user activity. The electronic device 300 may determine the location from which to track the user based on the type of the identified activity and the characteristics of the identified activity.

According to various embodiments of the disclosure, the electronic device 300 may move the electronic device 300 based on the determined location in operation 1750.

According to various embodiments of the disclosure, the electronic device 300 may track the user activity after the electronic device 300 moves in operation 1760.

According to various embodiments of the disclosure, the electronic device 300 may track the user activity based on continuity of the activity. The continuity of the activity may be a characteristic of continuously performing the same activity. The electronic device 300 may track the user activity in response to determination that the continuity of the activity is maintained. The electronic device 300 may determine that the user performs a new activity in response to a determination that the continuity of the activity is interrupted. The electronic device 300 may perform various operations for tracking the new activity (including operations for recognizing the activity and determining the location from which to track the new activity) in response to a determination that the user performs a new activity.

According to various embodiments of the disclosure, the electronic device 300 may provide the activity result based on the tracking result in operation 1770.

According to various example embodiments of the disclosure, there may be various methods of providing the activity result. For example, the result of the activity may be provided through a user interface (not shown) (for example, a speaker or a display). In another example, the electronic device 300 may provide the activity result by transmitting the activity result to an external electronic device (for example, the external electronic device 1601 of FIG. 16) through a wireless communication circuit (for example, the wireless communication circuit 340 of FIG. 3). The external electronic device 1601 may provide the activity result through an augmented-reality platform.

A method of operating an electronic device according to various embodiments of the disclosure may include: acquiring a voice and/or an image of a user through a microphone and/or a camera of the electronic device; identifying the user based on the voice and/or the image; identifying an activity of the user based on at least one piece of movement information of the identified user, location information, or information on an object that the user is using; determining a location from which to track the user based on the identified activity; controlling a driver of the electronic device to move the housing based at least in part on the determined location; tracking the activity of the user based on continuity of the activity after movement; and providing the result of the activity based on the tracking result.

The method of operating the electronic device according to various embodiments of the disclosure may further include completing tracking of the activity of the user based on the continuity of the activity and classifying the activity based on the tracking result and providing a result thereof.

In the method of operating the electronic device according to various embodiments of the disclosure, the result of the activity of the user may include at least one of a place where the user is located while the user performs the activity, a type of the activity of the user, a time at which the user performs the activity, and an emotion of the user.

The method of operating the electronic device according to various embodiments of the disclosure may further include identifying the characteristics of the activity, determining a location from which to track the user and a movement range for tracking the user based on the characteristics of the activity, and controlling the driver to move the housing based on the location from which to track the user and the movement range.

In the method of operating the electronic device according to various embodiments of the disclosure, the identified characteristics of the activity may include a range of the location to which the user is expected to move while the user performs the activity.

The method of operating the electronic device according to various embodiments of the disclosure may further include analyzing an image acquired using the at least one camera while the activity of the user is tracked, determining whether the user can be identified based on a result of analysis of the acquired image, and determining whether the electronic device moves based at least partially on a result of the determination that the user cannot be identified.

The method of operating the electronic device according to various embodiments of the disclosure may further include identifying whether there is an external electronic device capable of tracking the activity of the user in a space in which the user performs the activity and controlling the external electronic device to track the activity of the user based at least partially on the identification of whether there is an external electronic device.

The method of operating the electronic device according to various embodiments of the disclosure may further include receiving a user request for outputting the result of the activity and providing at least a portion of the result of the activity corresponding to a condition included in the user request.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand that various changes in form and details may be made without departing from the true spirit and full scope of the disclosure, examples of which are recited in the appended claims.

What is claimed is:
1. An electronic device comprising:
a housing:
a user interface;
at least one microphone disposed in the housing;
at least one camera disposed in the housing;
at least one driver comprising driving circuitry connected to or disposed in the housing and configured to move the housing;
a wireless communication circuit disposed within the housing;

a processor operatively connected to the user interface, the microphone, the camera, the driver, and the wireless communication circuit; and
a memory operatively connected to the processor,
wherein the memory stores instructions which, when executed by the processor, control the electronic device to:
acquire a voice and/or an image of a user through the microphone and/or the camera,
identify the user based on the voice and/or the image,
identify an activity of the user based on at least one piece of movement information of the identified user, location information, or information on an object that the user is using,
determine a location from which to track the user based on the identified activity,
control the driver to move the housing based at least in part on the determined location,
track the activity of the user based on continuity of the activity after the movement of the housing, and provide a result of the activity based on the tracking result,
wherein the instructions are further configured to, when executed by the processor, control the electronic device to:
classify a result of the activity according to a preset condition,
store the result in the memory,
receive a user request for outputting the result of the activity, and
provide at least a portion of the result of the activity corresponding to a condition included in the user request.

2. The electronic device of claim 1, wherein the instructions, when executed by the processor, control the electronic device to: complete tracking of the activity of the user based on the continuity of the activity, classify the activity based on the tracking result, and provide a result thereof.

3. The electronic device of claim 1, wherein the memory is configured to store one or more models configured to recognize an environment around the user and one or more models configured to recognize the activity of the user, and the instructions, when executed by the processor, control the electronic device to: acquire an image obtained by capturing the user through the at least one camera while the activity is tracked, determine a characteristic of the activity of the user through the acquired image and the one or more models, and acquire a result of the activity of the user based on the characteristic of the activity of the user.

4. The electronic device of claim 1, wherein the result of the activity of the user includes at least one of a place where the user is located while the user performs the activity, a type of the activity of the user, a time at which the user performs the activity, and an emotion of the user.

5. The electronic device of claim 1, wherein the instructions, when executed by the processor, control the electronic device to: identify a characteristic of the activity, determine a location from which to track the user and a movement range for tracking the user based on the characteristic of the activity, and control the driver to move the housing based on the location from which to track the user and the movement range.

6. The electronic device of claim 5, wherein the identified characteristic of the activity includes a range of the location to which the user is expected to move while the user performs the activity.

7. The electronic device of claim 4, wherein the instructions, when executed by the processor, control the electronic device to: analyze an image acquired using the at least one camera while the activity of the user is tracked, determine whether it is possible to identify the user based on a result of analysis of the acquired image, and determine whether the electronic device moves based at least in part on a result of the determination that it is not possible to identify the user.

8. The electronic device of claim 4, wherein the instructions, when executed by the processor, control the electronic device to: determine whether it is possible to identify at least a body part of the user related to the activity based on a result of analysis of the acquired image and determine whether the electronic device moves based at least in part on a determination result indicating that at it is not possible to identify least the body part of the user related to the activity.

9. The electronic device of claim 5, wherein the instructions, when executed by the processor, control the electronic device to: identify whether there is an external electronic device capable of tracking the activity of the user in a space in which the user performs the activity and control the external electronic device to track the activity of the user based at least in part on identification of whether there is an external electronic device.

10. The electronic device of claim 9, wherein the instructions, when executed by the processor, control the electronic device to determine to not move the housing based at least in part on the identification of whether there is an external electronic device.

11. The electronic device of claim 1, wherein the instructions, when executed by the processor, control the electronic device to: transmit at least the portion of the result of the activity to the external electronic device to provide at least the portion of the result of the activity through an augmented-reality platform.

12. A method of operating an electronic device comprising a housing, a microphone disposed in the housing, a camera disposed in the housing, and a driver comprising driving circuitry connected to and/or disposed in the housing and configured to move the housing, the method comprising:
acquiring a voice and/or an image of a user through the microphone and/or the camera;
identifying the user based on the voice and/or the image;
identifying an activity of the user based on at least one piece of movement information of the identified user, location information, or information on an object that the user is using;
determining a location from which to track the user based on the identified activity;
controlling the driver of the electronic device to move the housing based at least in part on the determined location;
tracking the activity of the user based on continuity of the activity after the movement of the housing; and
providing a result of the activity based on the tracking result,
wherein the method further comprises:
classifying a result of the activity according to a preset condition;
storing the result in a memory of the electronic device;
receiving a user request for outputting the result of the activity; and
providing at least a portion of the result of the activity corresponding to a condition included in the user request.

13. The method of claim 12, wherein the result of the activity of the user includes at least one of a place where the user is located while the user performs the activity, a type of the activity of the user, a time at which the user performs the activity, and an emotion of the user.

14. The method of claim 12, further comprising:
identifying a characteristic of the activity;
determining a location from which to track the user and a movement range for tracking the user based on the characteristic of the activity; and
controlling the driver to move the housing based on the location from which to track the user and the movement range.

15. The method of claim 14, wherein the identified characteristic of the activity includes a range to the location to which the user is expected to move while the user performs the activity.

16. The method of claim 14, further comprising:
analyzing an image acquired using the camera while the activity of the user is tracked;
determining whether it is possible to identify the user based on a result of analysis of the acquired image; and
determining whether the electronic device moves based at least in part on a result of a determination that it is not possible to identify the user.

17. The method of claim 14, further comprising:
identifying whether there is an external electronic device capable of tracking the activity of the user in a space in which the user performs the activity; and
controlling the external electronic device to track the activity of the user based at least in part on an identification of whether there is an external electronic device.

\* \* \* \* \*